United States Patent
Radovanovic

(10) Patent No.: US 9,361,038 B1
(45) Date of Patent: Jun. 7, 2016

(54) SCALABLE DATA STORAGE ARCHITECTURE AND METHODS OF ELIMINATING I/O TRAFFIC BOTTLENECKS

(71) Applicant: Branislav Radovanovic, Potomac, MD (US)

(72) Inventor: Branislav Radovanovic, Potomac, MD (US)

( * ) Notice: Subject to any disclaimer, the term of this patent is extended or adjusted under 35 U.S.C. 154(b) by 0 days.

(21) Appl. No.: 14/813,533

(22) Filed: Jul. 30, 2015

Related U.S. Application Data

(63) Continuation of application No. 14/252,268, filed on Apr. 14, 2014, now Pat. No. 9,118,698, which is a continuation-in-part of application No. 13/731,854, filed on Dec. 31, 2012, now Pat. No. 8,725,906, which is a continuation-in-part of application No. 11/292,838, filed on Dec. 2, 2005, now Pat. No. 8,347,010.

(51) Int. Cl.
*G06F 3/06* (2006.01)
*G06F 13/38* (2006.01)

(52) U.S. Cl.
CPC .............. *G06F 3/064* (2013.01); *G06F 3/061* (2013.01); *G06F 3/0656* (2013.01); *G06F 3/0689* (2013.01); *G06F 13/385* (2013.01)

(58) Field of Classification Search
None
See application file for complete search history.

(56) References Cited

U.S. PATENT DOCUMENTS

| | | | |
|---|---|---|---|
| 6,029,168 A | 2/2000 | Frey | |
| 6,427,212 B1 | 7/2002 | Frey et al. | |
| 6,530,036 B1 | 3/2003 | Frey et al. | |
| 6,820,171 B1 | 11/2004 | Weber et al. | |
| 7,127,633 B1 | 10/2006 | Olson et al. | |
| 7,225,317 B1 | 5/2007 | Glade et al. | |
| 7,228,391 B2 | 6/2007 | Silvera et al. | |
| 2002/0103889 A1 | 8/2002 | Markson et al. | |
| 2002/0103943 A1 | 8/2002 | Lo et al. | |
| 2003/0217310 A1 | 11/2003 | Ebsen et al. | |
| 2005/0289152 A1 | 12/2005 | Earl et al. | |
| 2006/0005076 A1 | 1/2006 | Brown et al. | |
| 2006/0029069 A1 | 2/2006 | Frank et al. | |

OTHER PUBLICATIONS

Science Direct, Patrick Geoffray, "OPIOM: Off Processor I/O with Myrinet", Myricom Inc., Jan. 1, 2002. pp. 1-14.
Science Direct, Patrick Geoffray, "OPIOM: Off Processor I/O with Myrinet", Myricom Inc., Jan. 1 2002, pp. 1-14.

(Continued)

*Primary Examiner* — Idriss N Alrobaye
*Assistant Examiner* — Dayton Lewis-Taylor
(74) *Attorney, Agent, or Firm* — Lathrop & Gage LLP

(57) ABSTRACT

A Storage Area Network (SAN) system has host computers, front-end SAN controllers (FE_SAN) connected via a bus or network interconnect to back-end SAN controllers (BE_SAN), and physical disk drives connected via network interconnect to the BE_SANs to provide distributed high performance centrally managed storage. Described are hardware and software architectural solutions designed to eliminate I/O traffic bottlenecks, improve scalability, and reduce the overall cost of SAN systems. In an embodiment, the BE_SAN has firmware to recognize when, in order to support a multidisc volume, such as a RAID volume, it is configured to support, it requires access to a physical disk attached to a second BE_SAN; when such a reference is recognized it passes assess commands to the second BE_SAN. Buffer memory of each FE_SAN is mapped into application memory space to increase access speed, where multiple hosts share an LBA the BE_SAN tracks writes and invalidates the unwritten buffers.

5 Claims, 18 Drawing Sheets

Storage Area Network (SAN) with multiple controllers with distributed data access architecture

(56) References Cited

OTHER PUBLICATIONS

Patrick Geoffray OPIOM: Off-Processor i/O with Myrinet.
"High Bandwidth Data Transfer with OPIOM & Myrinet: Application to Remote Video," Goglin et al., Jun.-Aug. 2001.
"Guide to Myrinet—2000 Switches and Switch Networks," Myricon, Inc., Aug. 2001.
"SANique CFS a SAN-Based Cluster File System Technical Whitepaper," MacroImpact, Aug. 2002.
"VISA: Netstation's Virtual Internet SCSI Adapter," Van Meter et al., University of Southern California, 1998.
Application and File History of U.S. Appl. No. 11/208,773, Radovanovic, filed Sep. 29, 2003, 397 pages.
Selected pages from File History of U.S. Appl. No. 11/292,838, dated Feb. 6, 2008 through Nov. 30, 2012, 296 pages.
Select pages from File History of U.S. Appl. No. 13/731,854, dated May 15, 2013 through Dec. 26, 2013, 33 pages.
Select pages from File History of U.S. Appl. No. 14/252,268, dated Feb. 10, 2015 through Jul. 21, 2015, 30 pages.

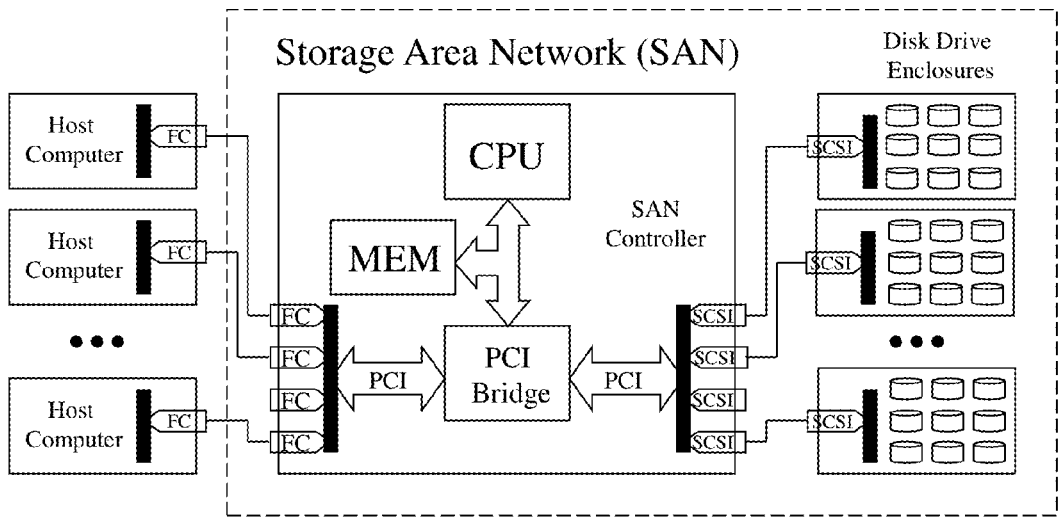
FIG. 1A Storage Area Network (SAN) with single controller utilizing SCSI disk drives (PRIOR ART)
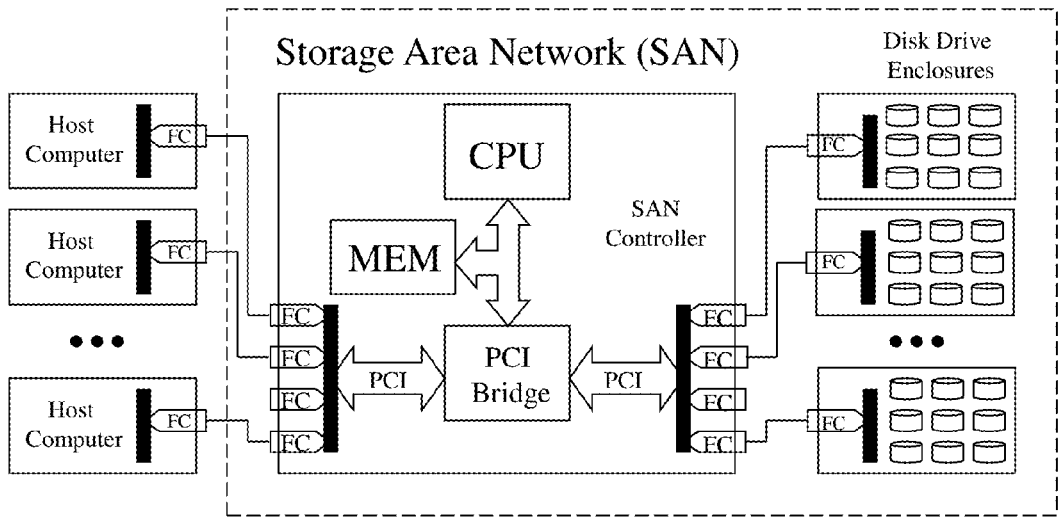
FIG. 1B Storage Area Network (SAN) with single controller utilizing FC disk drives (PRIOR ART)

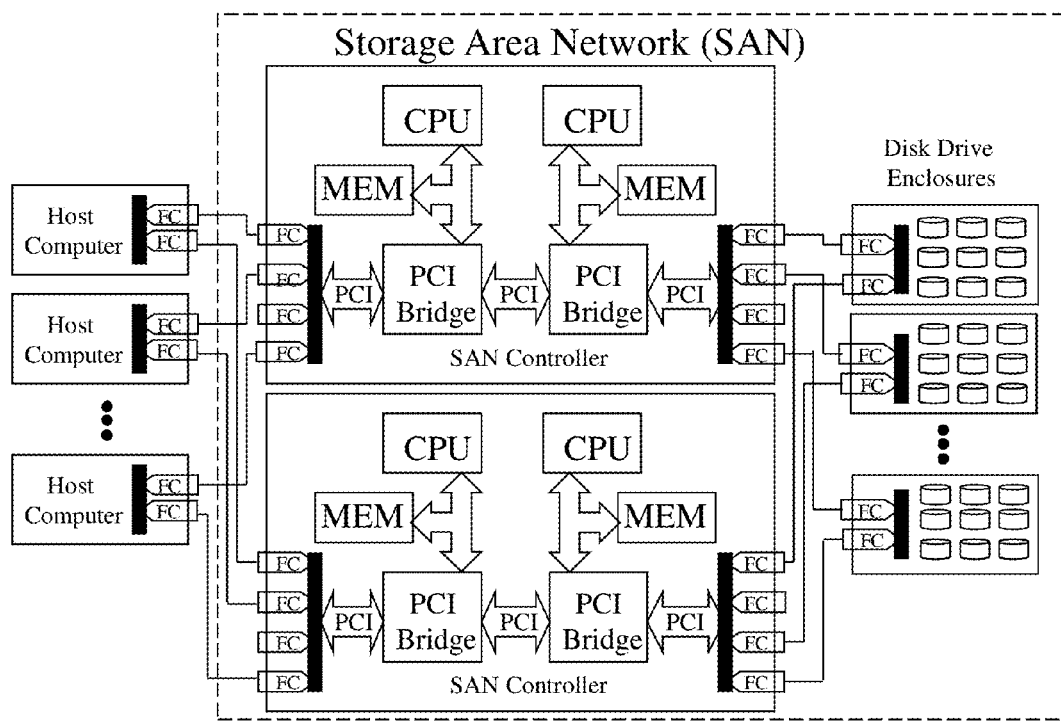
FIG. 2 Storage Area Network (SAN) with dual controller utilizing FC disk drives
(PRIOR ART)

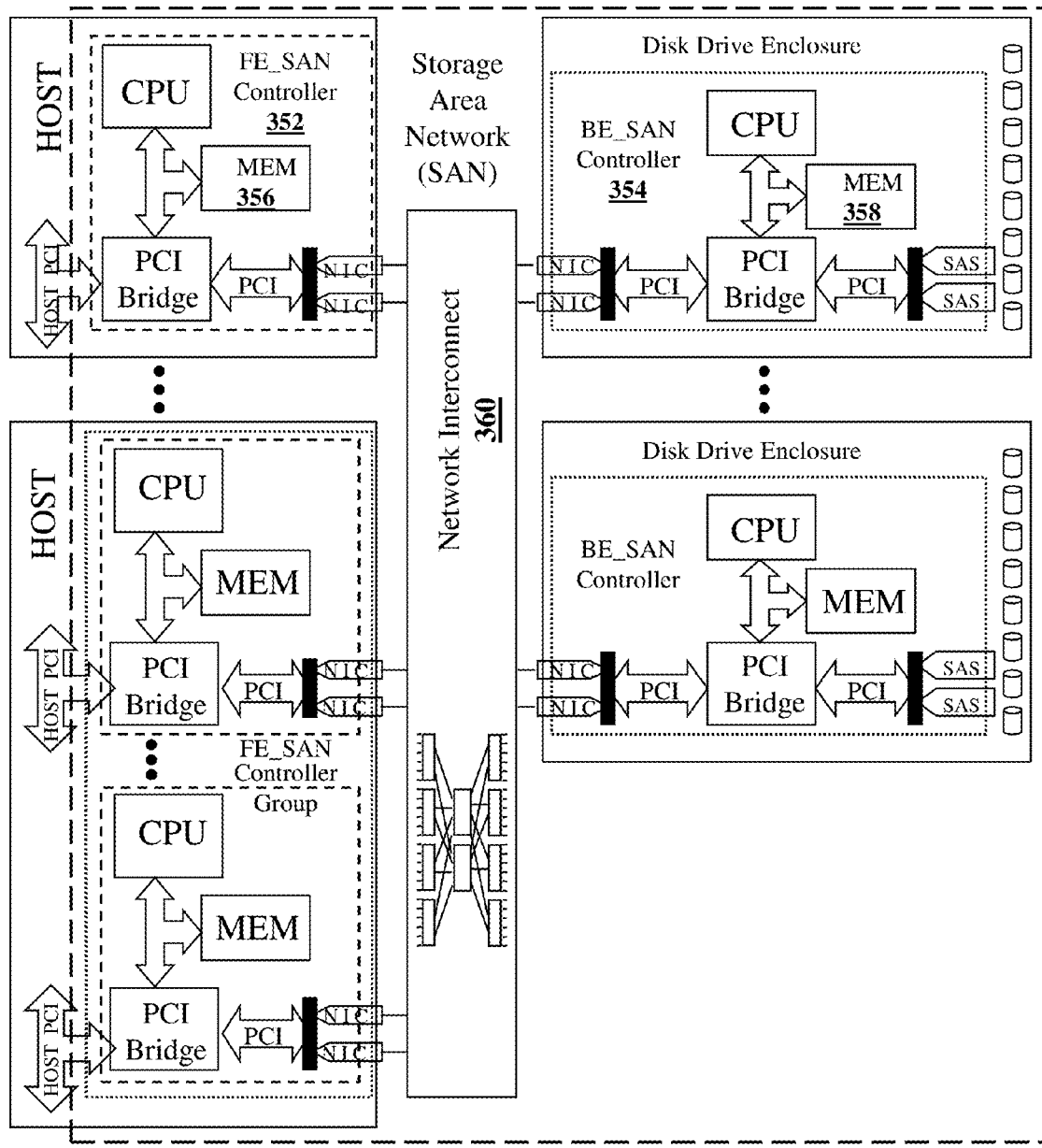
FIG. 3 Storage Area Network (SAN) with multiple controllers with distributed data access architecture

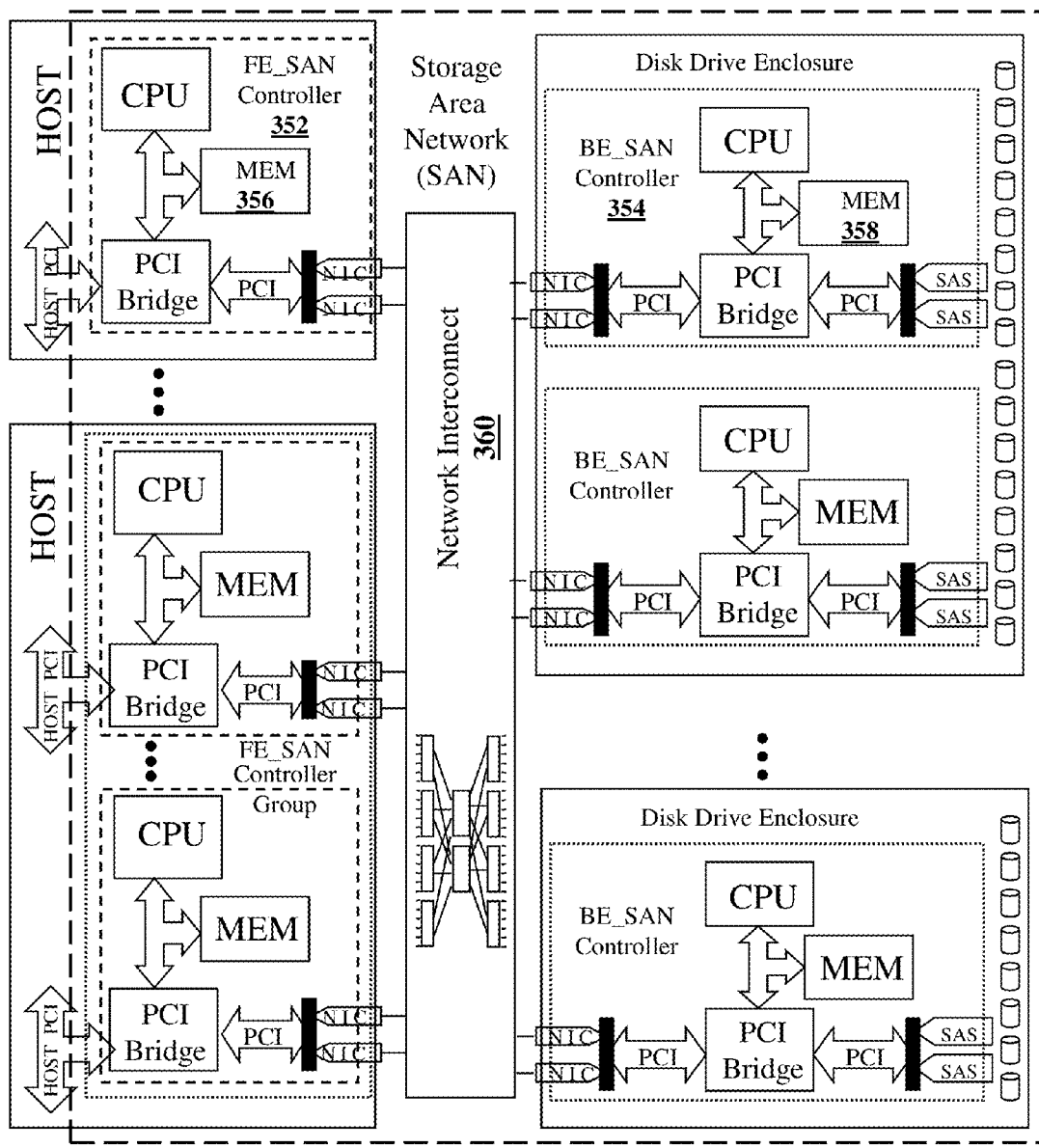
FIG. 3A Storage Area Network (SAN) with multiple controllers with distributed data access architecture

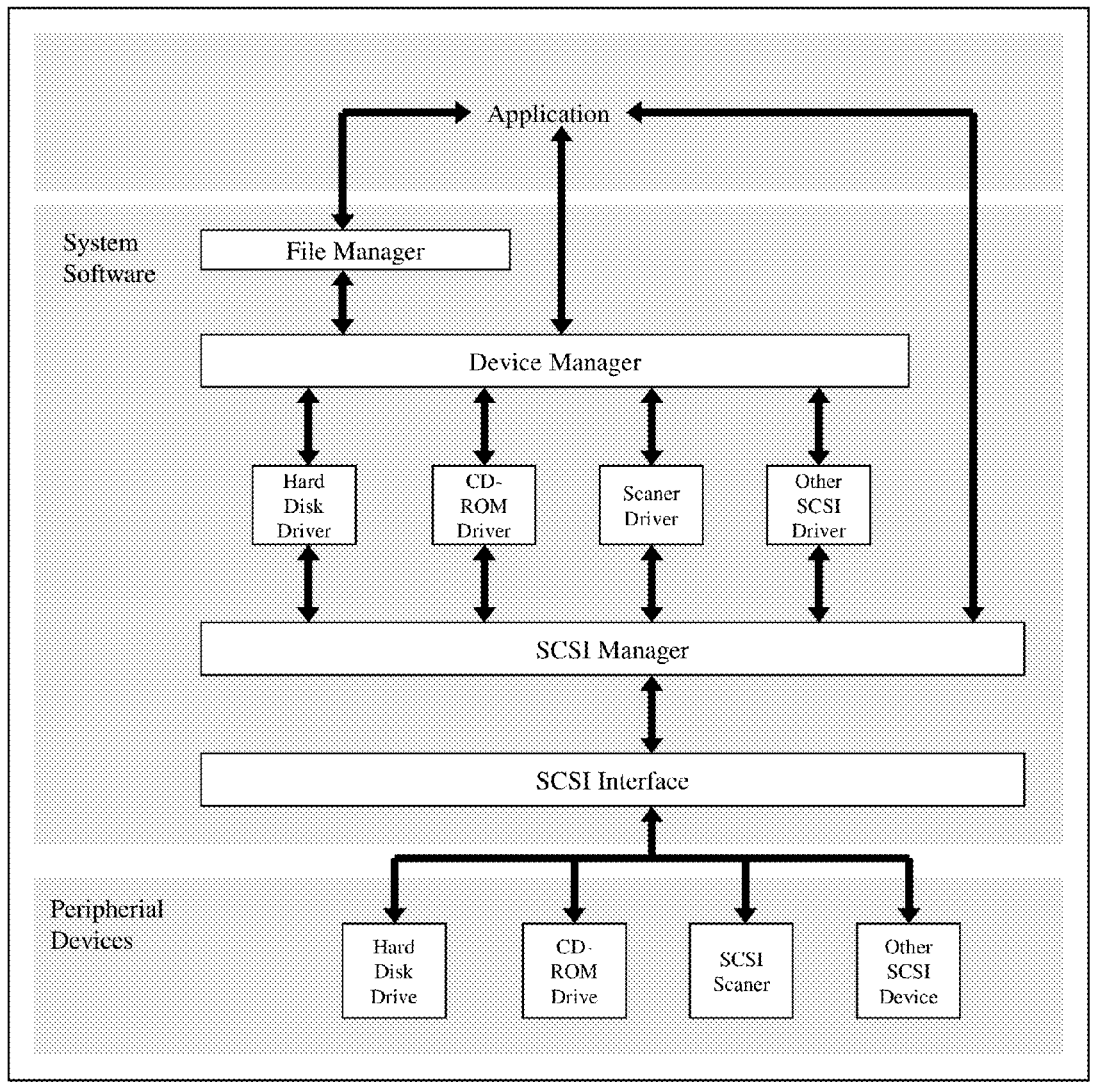
FIG. 4 System view of I/O related layers to access SCSI devices
(PRIOR ART)

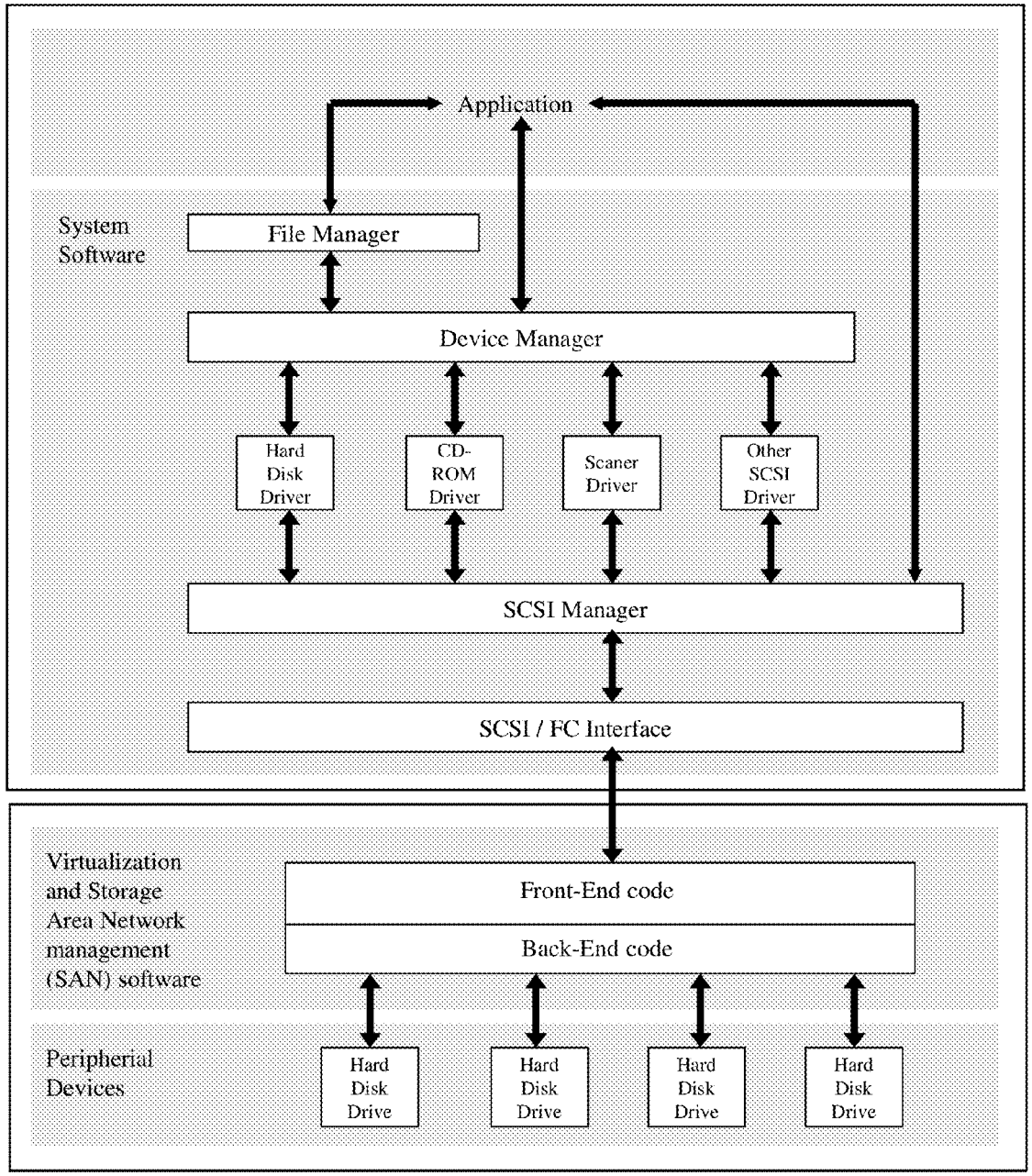
FIG. 5A System view of I/O related layers to access
SCSI devices over Storage Area Networks (SAN)
(PRIOR ART)

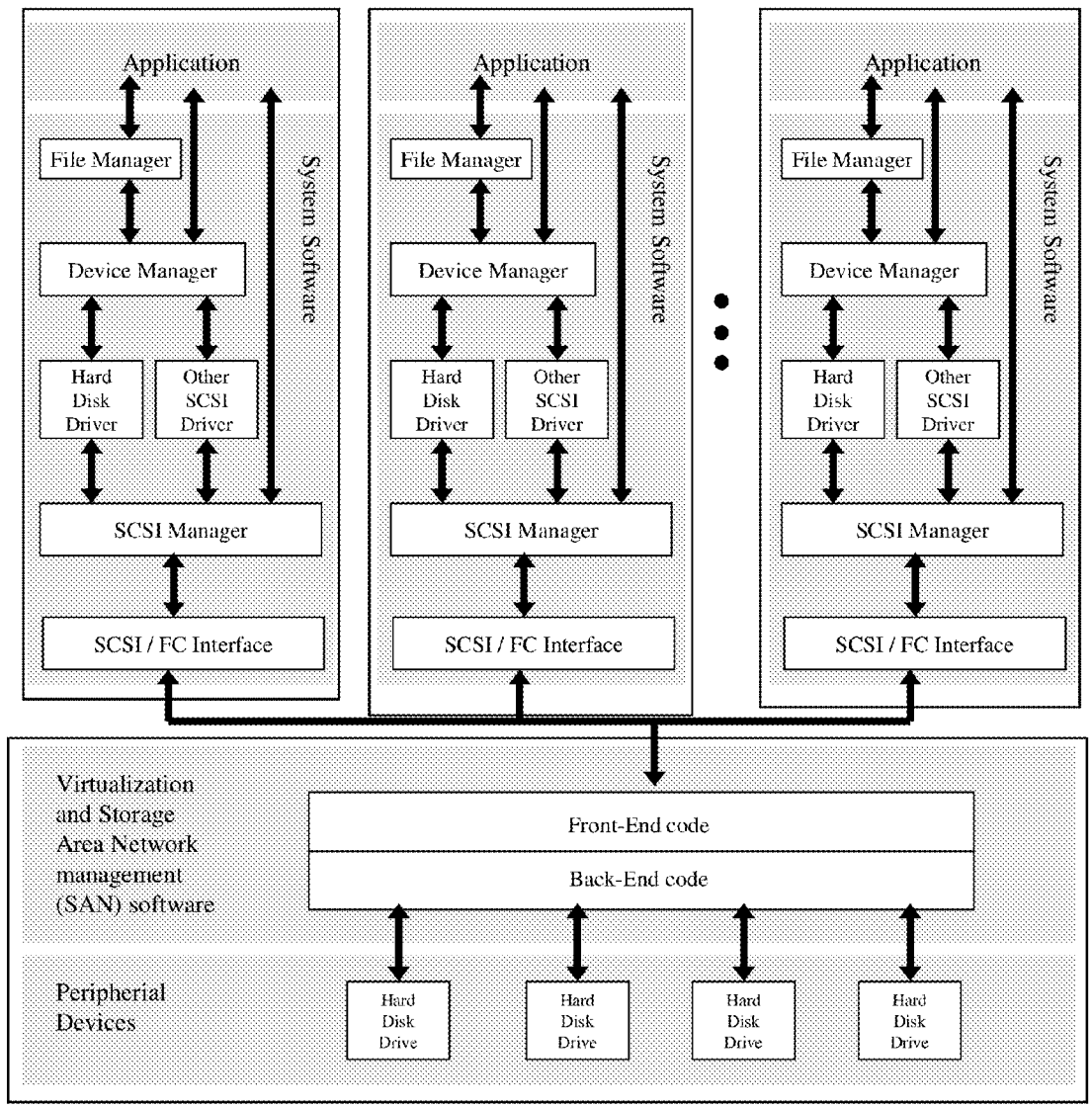
FIG. 5B System view of I/O related layers to access
SCSI devices over Storage Area Networks (SAN)
(PRIOR ART)

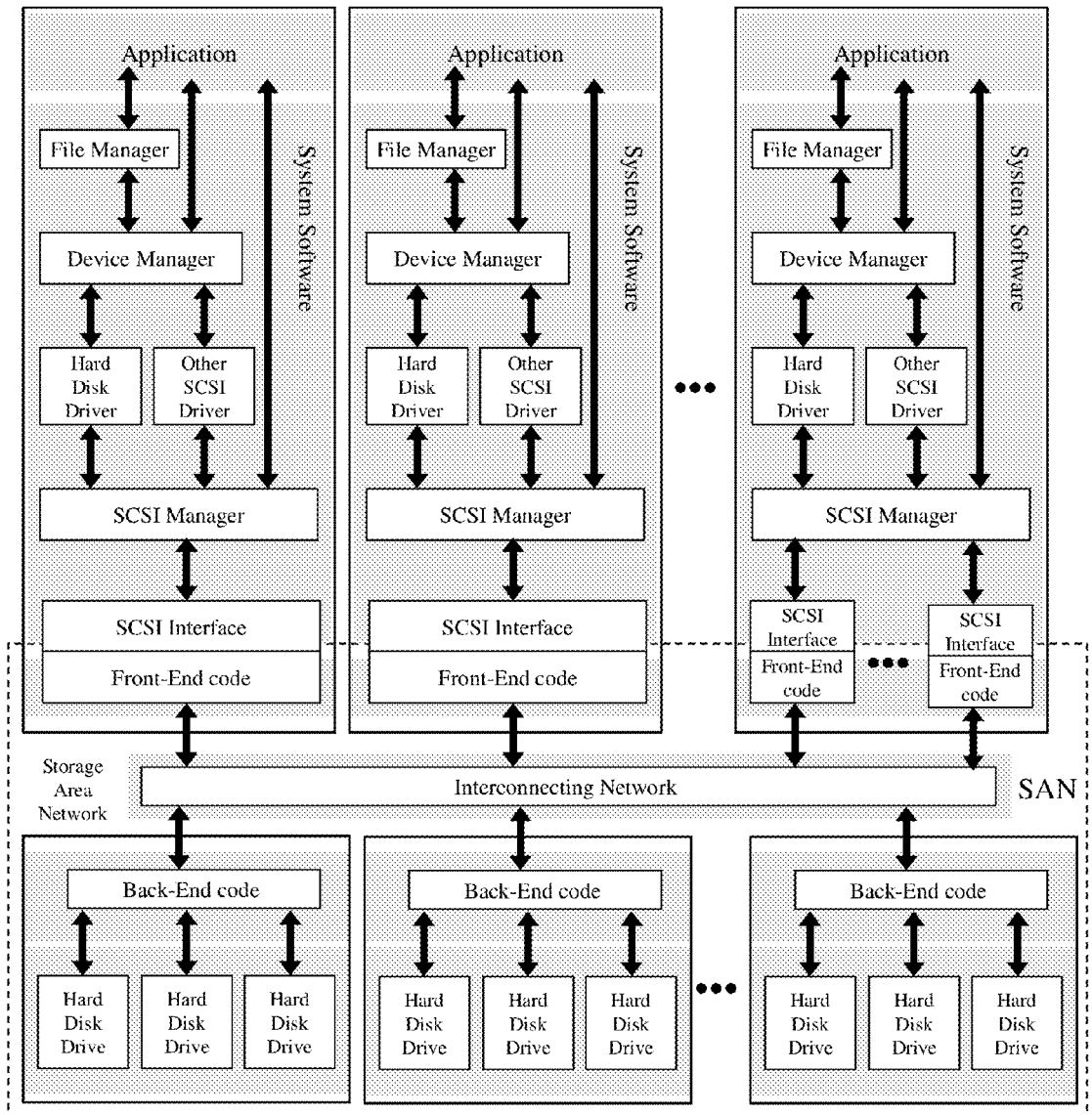
FIG. 6 System view of I/O related layers to access SCSI devices over Storage Area Networks (SAN)

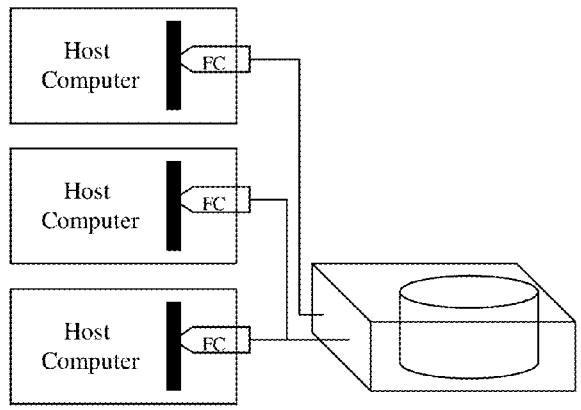
FIG. 7A Single disk drive provides reservation and persistent reservation (PRIOR ART)
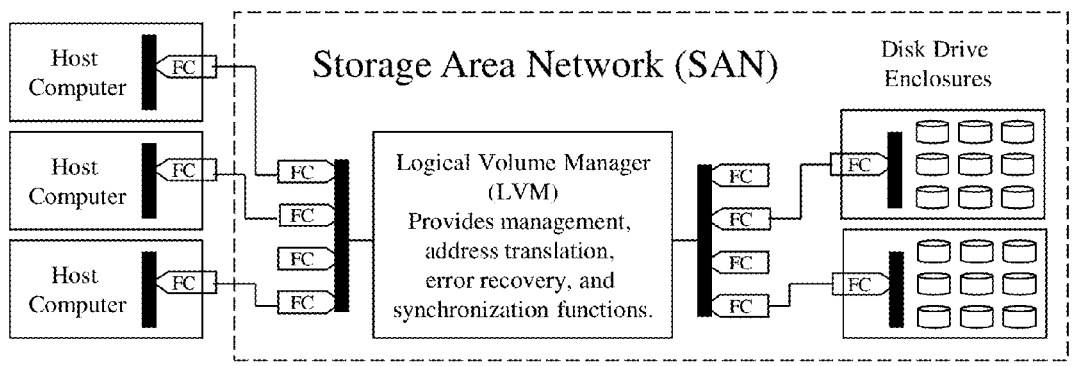
FIG. 7B Monolithic Logical Volume Manager (LVM) provides reservation and persistent reservation (PRIOR ART)

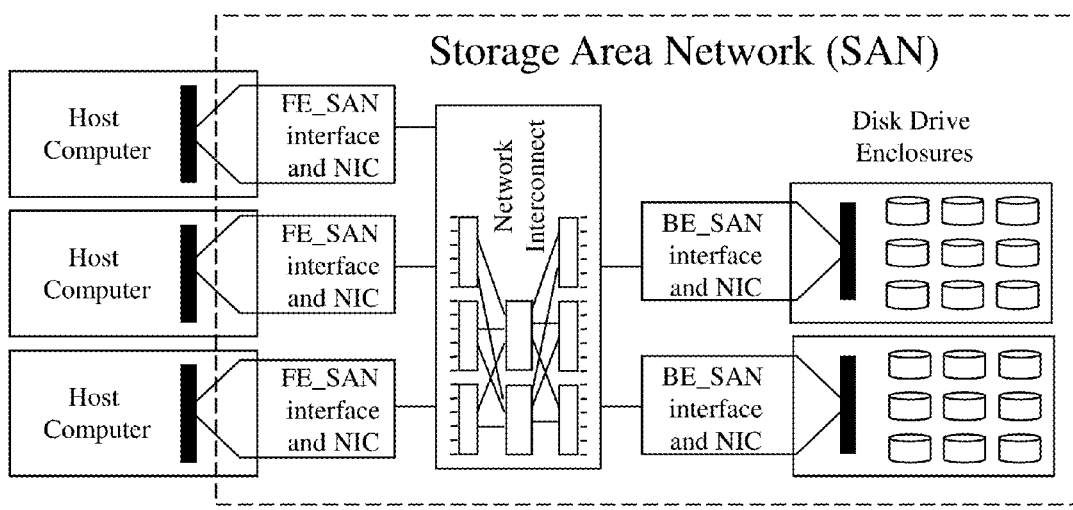

FIG. 8A The architecture described in the invention uses
distributed (over the network) Logical Volume Manager (LVM)
providing reservation and persistent reservation
and other locking mechanisms.

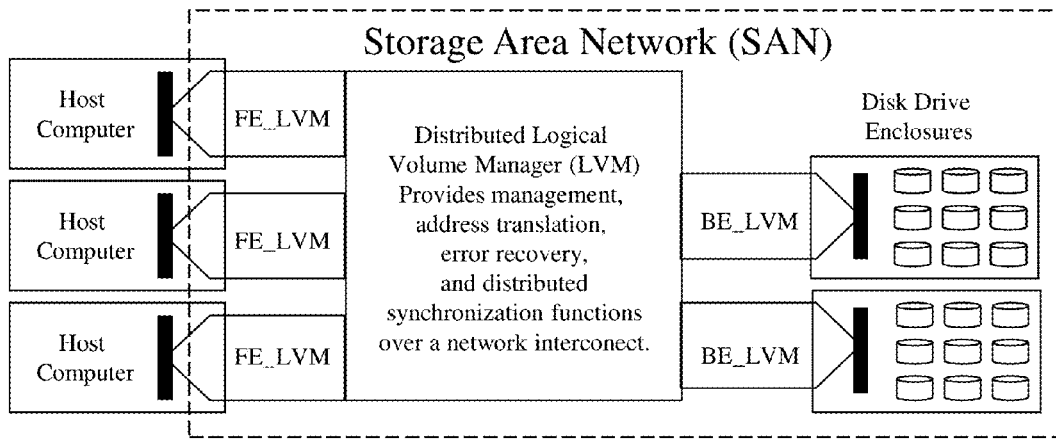

FIG. 8B Front-End LVMs (FE_LVMs) run independently from each other
and allocate resources as needed from the Back-End LVMs (BE_LVMs)
thus providing exclusive access to the allocated Logical Block Addresses

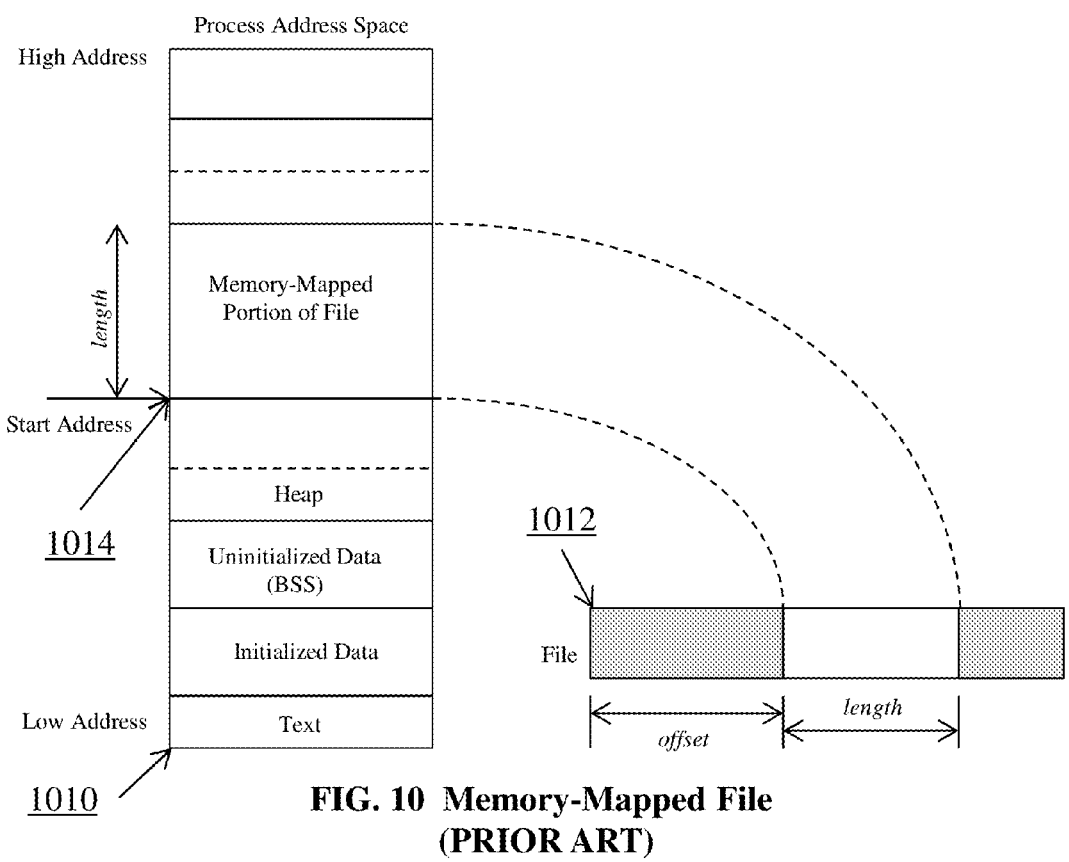
FIG. 10 Memory-Mapped File (PRIOR ART)

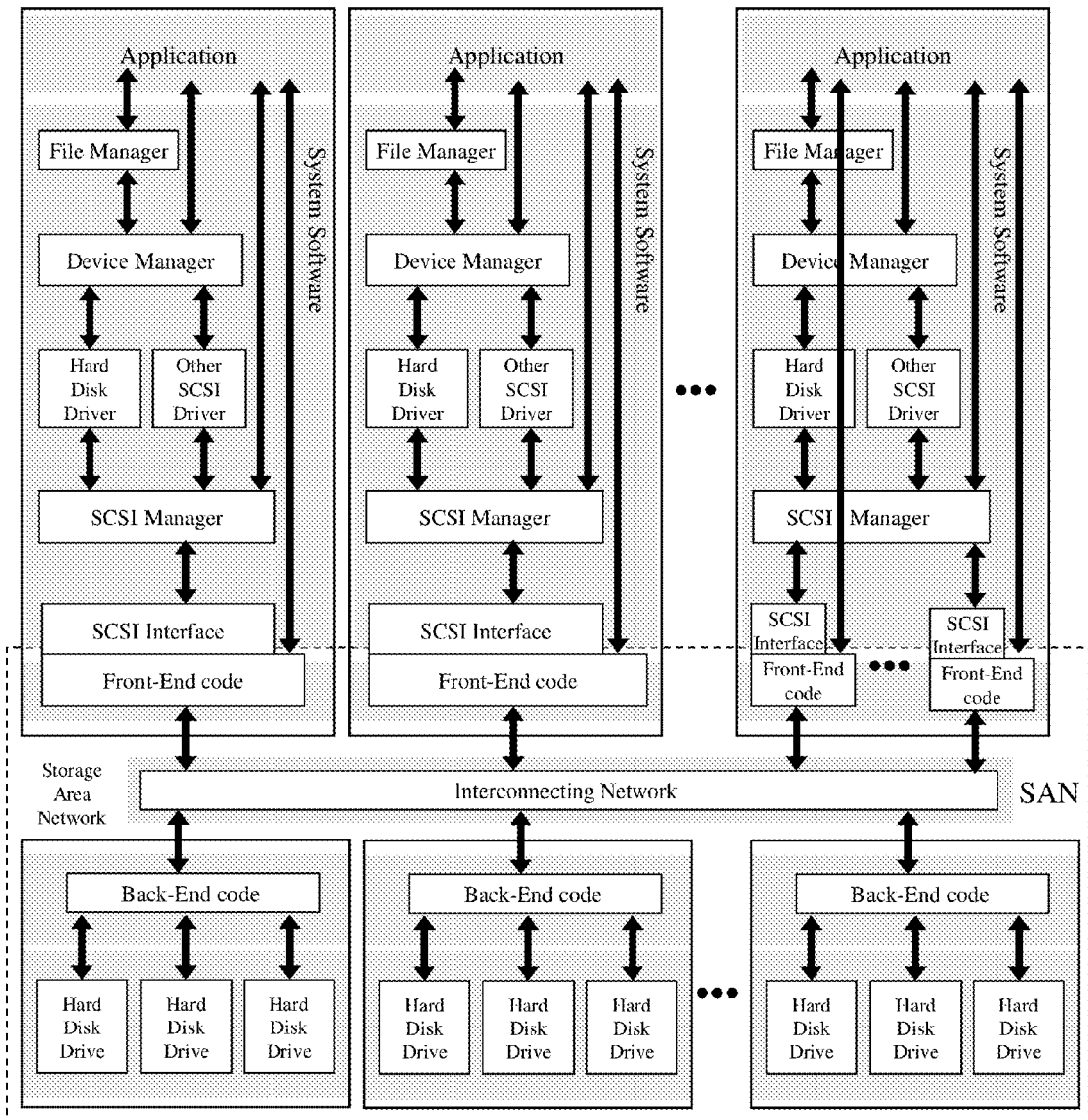
FIG. 11 System view of I/O related layers to access Memory-Mapped Files (Buffers) over Storage Area Networks (SAN)

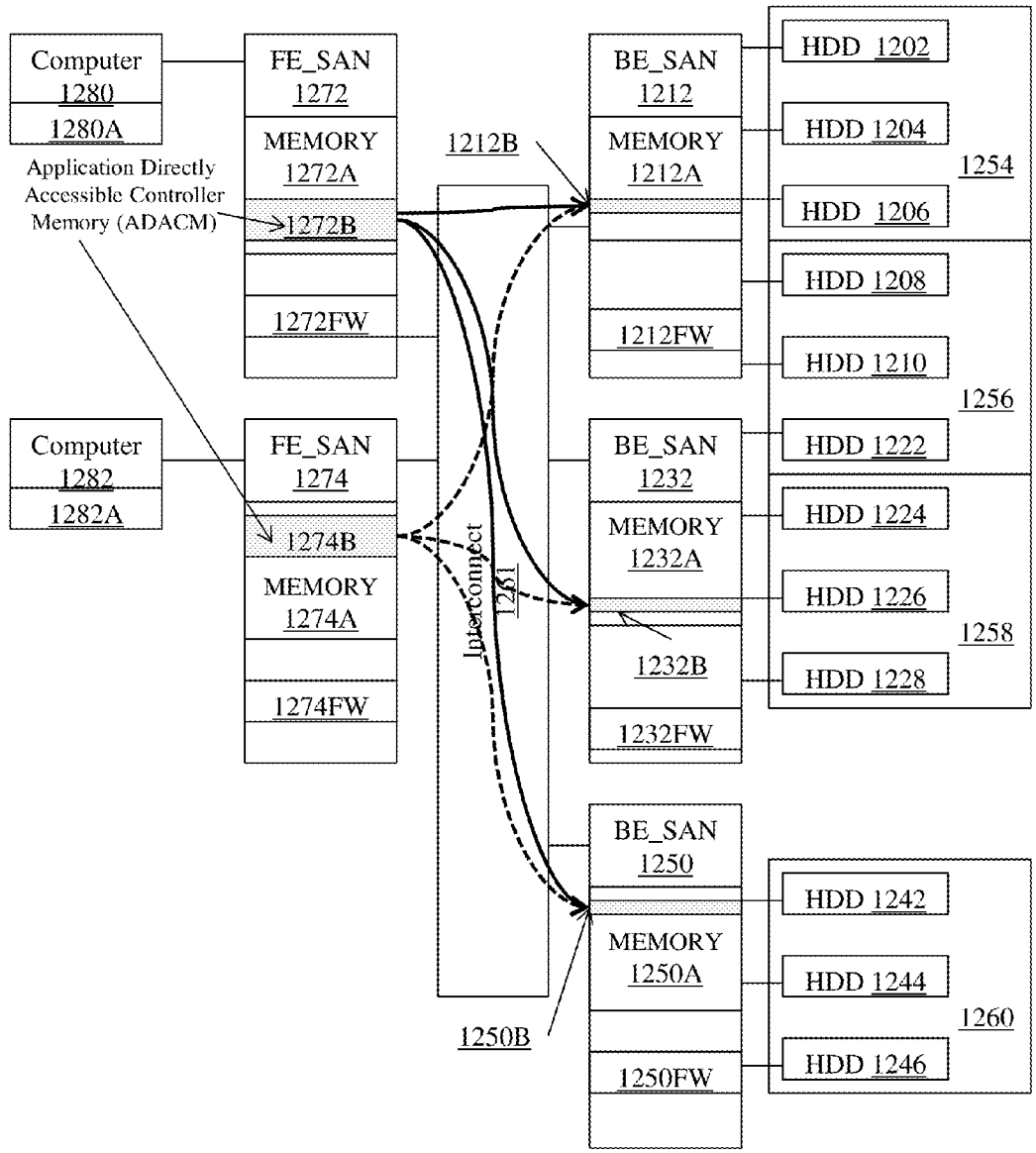
FIG. 12 Storage Area Network (SAN) with multiple controllers with host OS mapped FE_SAN controller memory

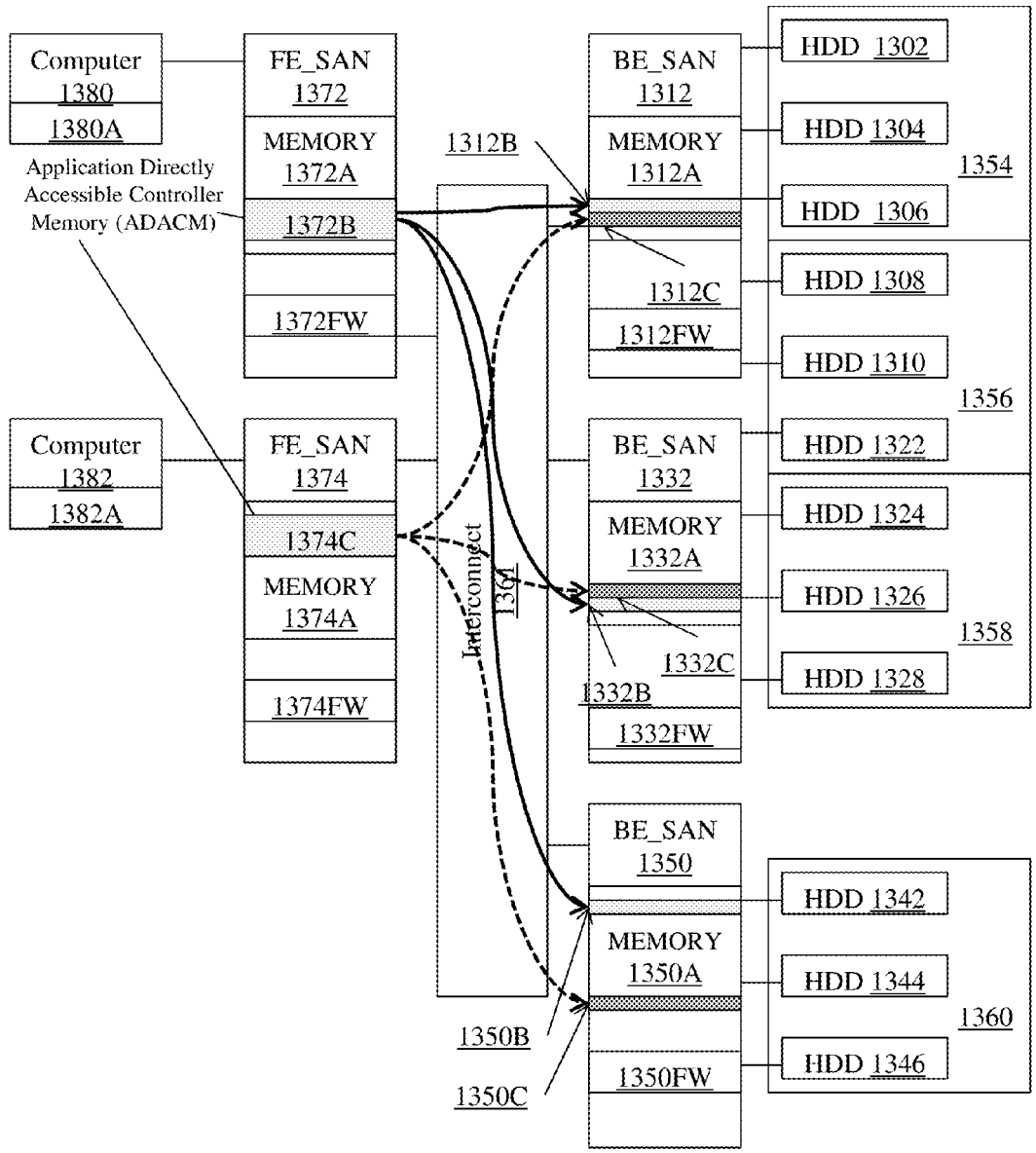
FIG. 13 Storage Area Network (SAN) with multiple controllers with host OS mapped FE_SAN controller memory

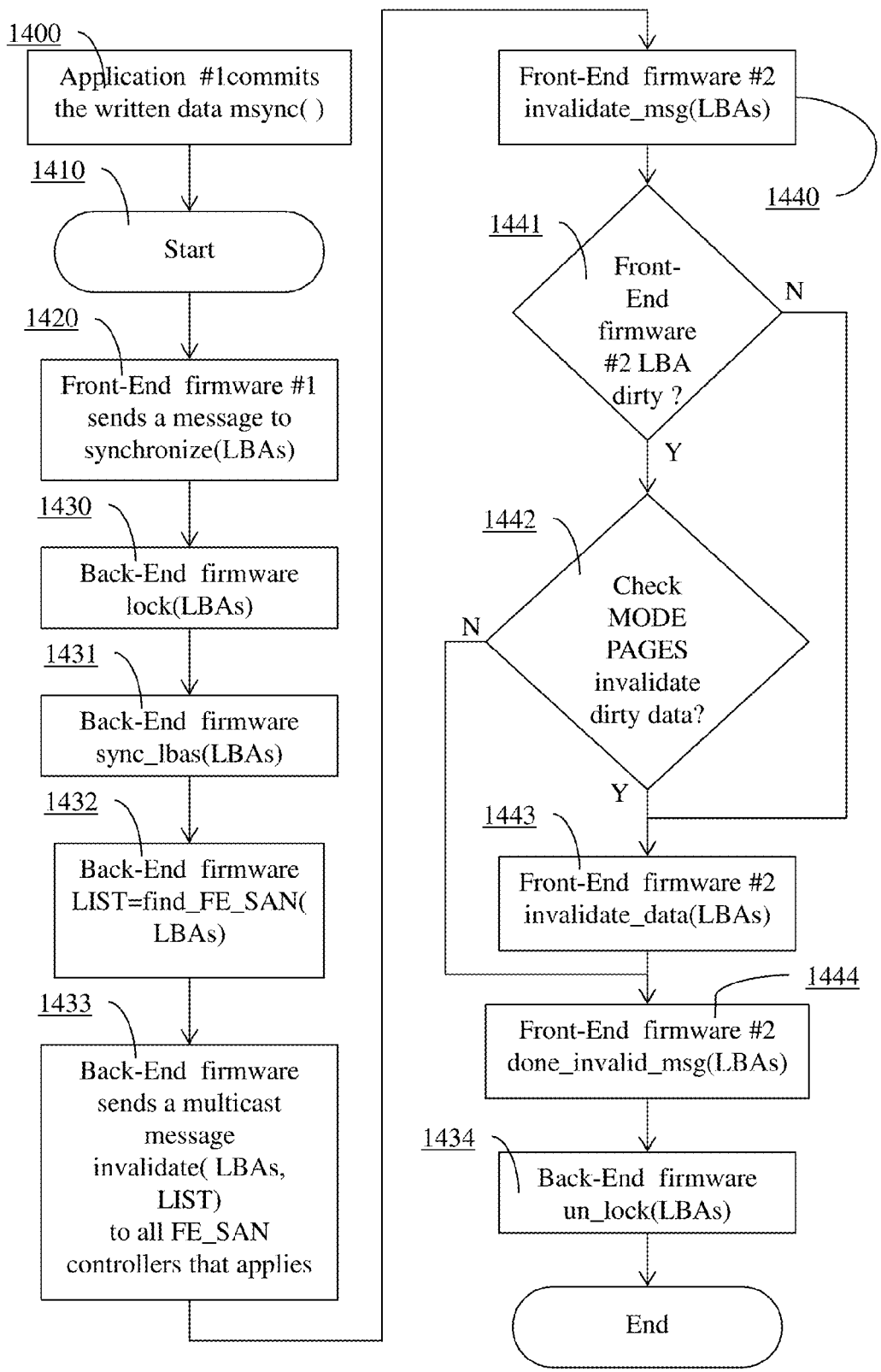
FIG. 14 Application #1 commits a write via msync( ) request

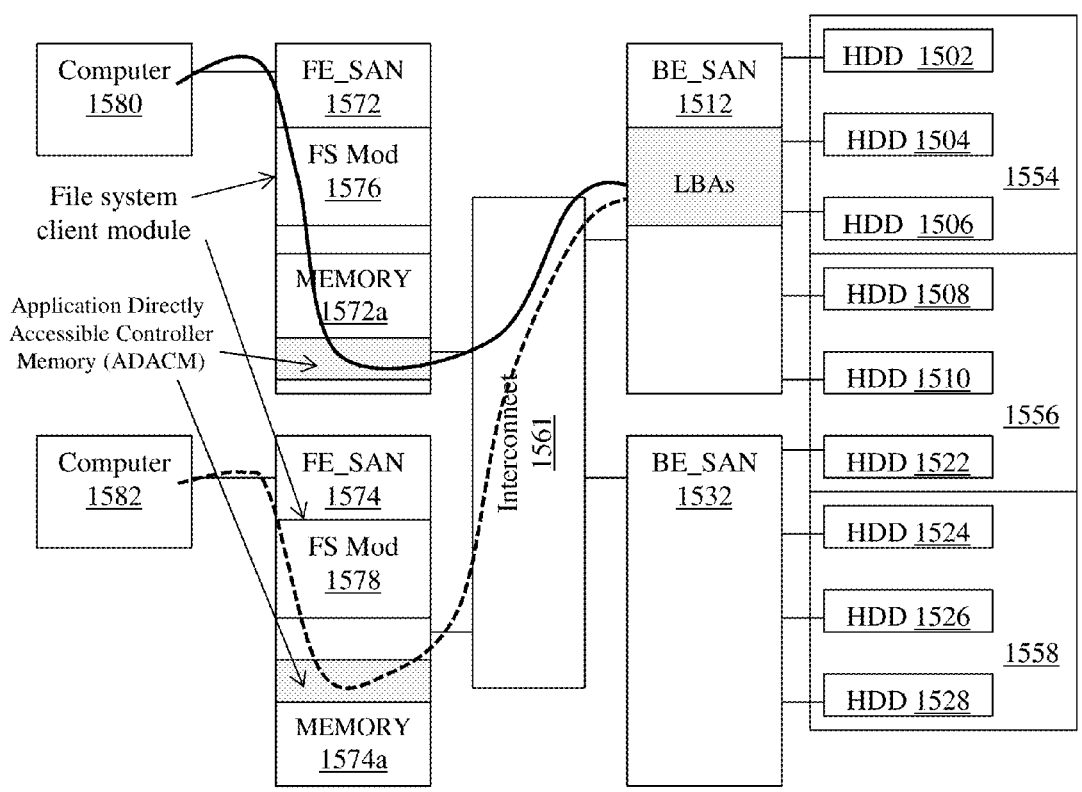
FIG. 15 Parallel File System module running directly on FE_SAN controller

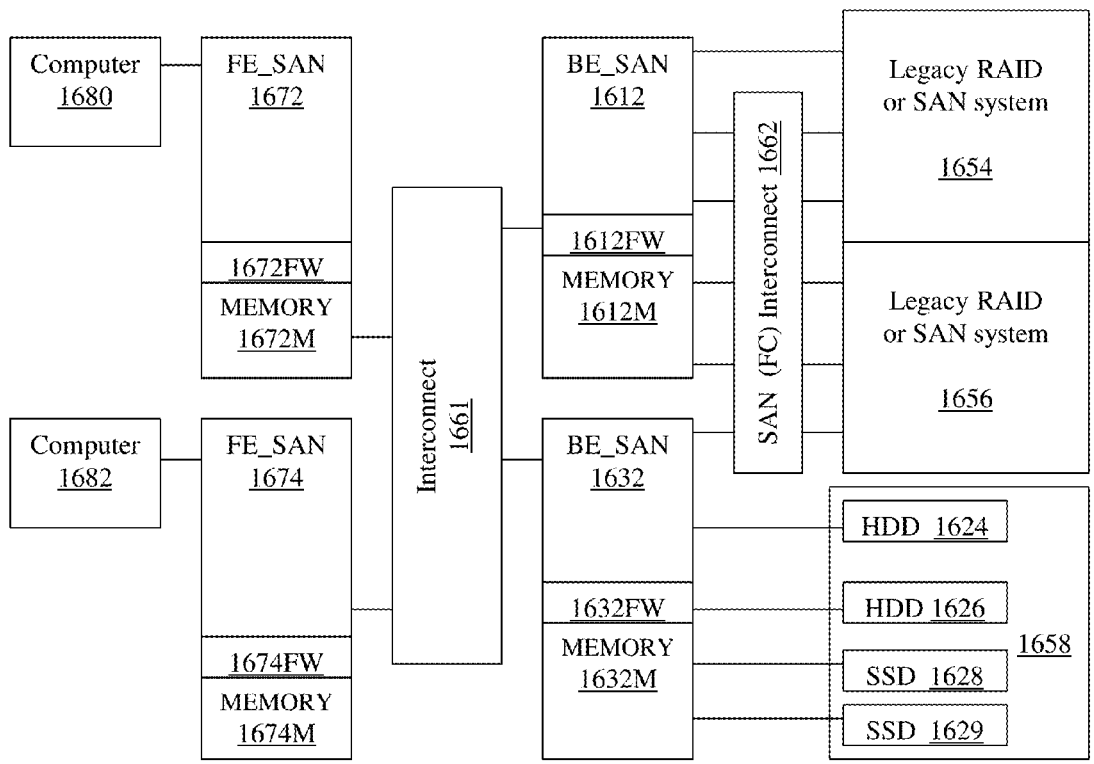
FIG. 16 Storage Area Network (SAN) with multiple controllers and with legacy RAID or SAN system attached at BE_SAN controllers

SCALABLE DATA STORAGE ARCHITECTURE AND METHODS OF ELIMINATING I/O TRAFFIC BOTTLENECKS

RELATED APPLICATIONS

This application is a continuation of U.S. patent application Ser. No. 14/252,268, filed Apr. 14, 2014 which is a continuation-in-part of U.S. patent application Ser. No. 13/731,854, filed Dec. 31, 2012 (now. U.S. Pat. No. 8,725, 906) which is a continuation-in-part of U.S. patent application Ser. No. 11/292,838, filed Dec. 2, 2005 (now U.S. Pat. No. 8,347,010), the disclosures of which are incorporated herein by reference.

BACKGROUND OF THE INVENTION

This invention relates generally to the field of storage RAID controllers and Storage Area Network (SAN) systems. As ever-increasing demand for more data hence, for more data storage, SAN and RAID technologies available today have failed to meet performance requirements and with prohibitively high cost made them out of reach for the majority of the small and some medium size businesses.

A majority of small and some medium size businesses and corporations, recognizing the productivity gains resulting from high-performance and high availability computing systems are often unable to acquire suchlike systems due to prohibitively high cost of data storage subsystems. To reduce the cost they often utilize large number of disjoint individual servers where each server is dedicated to one or more specific applications, such as mail servers, accounting application server, etc. This environment, clearly, leads to underutilized available aggregate computing power of all servers since each server is dedicated to specific application and the workload cannot be shared. This approach introduces other issues such as system and network administration, fault tolerance, fragmented data storage, data storage and backup management problems, as well as system complexity, and so forth. Data access and data sharing could be done at different levels such as at block level (shared block storage), multiple hosts accessing the same disk drives or Logical Unit Numbers (LUNs), or at the file level using file systems like Network File System, Common Internet File System, etc.

A Network File System (NFS) is a client/server application that facilitates viewing and optionally storing and updating files stored on a remote computer (often called a file server). The client system, which may be a work station or cluster node, has to run NFS client and the other computer, file server, needs the NFS server software. Both computers typically must have networking protocol software such as Transmission Control Protocol/Internet Protocol (TCP/IP) and networking hardware such as Ethernet, InfiniBand, Myrinet, or other Network Interface Cards (NICs) installed, since the NFS server and NFS client use network protocols to exchange the files data. This approach leads to a bandwidth bottleneck on both client and file server sides, mainly, due to NFS protocol overhead, limited Peripheral Component Interconnect (PCI) bus data rate, and possibly high latency associated with traditional architecture of the data storage subsystem attached to it.

A protocol standard developed by Microsoft, Common Internet File System (CIFS), which allows programs to make requests for files and services located on a remote computer, facilitates the same basic function as previously mentioned NFS. CIFS is typically utilized in Microsoft operating system environments to allow shared access from one computer to files stored on another remote computer within the same network. A CIFS client makes a request to a CIFS server (usually in another computer) for a file access or to pass a message. The server executes requested action and returns a response. CIFS is a public version of the Server Message Bock (SMB) protocol. The file server running CIFS suffers from the same problems as earlier mentioned NFS server because, this is in essence the same or similar hardware and technology.

TCP/IP protocol overhead together with network latency affects the performance of NFS/CIFS subsystems by significantly increasing access delays for network-attached disk when compared to locally attached disk. However, locally attached disk performance, usually, is much lower compared to data storage subsystem implementations such as RAID or Storage Area Network (SAN) subsystem. Traditional SAN design and implementation even though in many cases superior to locally attached disk drives, underutilize aggregate data rate potential of all attached disk drives by making use of time division multiplexing over typically small number of I/O (network) links between servers and the SAN subsystem attached to it.

SUMMARY

The present invention is an improvement over the existing data storage architectures by means of allowing parallel execution of the Front-End code on the independent FE_SAN controllers and employing locking mechanism in the Back-End code (executed on the BE_SAN controllers) to enforce data coherency and prevent data corruption.

In a preferred embodiment, the FE_SAN controllers accept all Small Computer System Interface (SCSI) commands, messages, and data for Front-End processing. The resulting output is forwarded to their intended BE_SAN controllers over the interconnecting network. Any network topology is allowed. From the BE_SAN controllers the SCSI commands, data, and messages after Back-End processing are sent to the anticipated SCSI targets (disk drives or memory persistent devices) or other storage systems. Neither SCSI target devices (disk drives) nor initiators (host computers) are aware of the underlying transport or FE_SAN and BE_SAN controllers. Hosts would perceive a "virtual" disk drive (or drives) attached to the FE_SAN (one or more). FE_SAN controllers could be configured as a controller group to share the load (command and message processing), enhancing the available bandwidth, and improving availability. In such cases, the host would have a notion of a single multi-channel controller attached to it.

A Storage Area Network (SAN) system has host computers, front-end SAN controllers (FE_SAN) connected via a bus or network interconnect to back-end SAN controllers (BE_SAN), and physical disk drives connected via network interconnect to the BE_SANs to provide distributed high performance centrally managed storage. Described are hardware and software architectural solutions designed to eliminate I/O traffic bottlenecks, improve scalability, and reduce the overall cost of SAN systems. In an embodiment, the BE_SAN has firmware to recognize when, in order to support a multidisc volume, such as a RAID volume, it is configured to support, it requires access to a physical disk attached to a second BE_SAN; when such a reference is recognized it passes assess commands to the second BE_SAN. Further, the BE_SAN has firmware to make use of the physical disk attached to the second BE_SAN as a hot-spare for RAID operations. Buffer memory of each FE_SAN is mapped into application memory space to increase access speed, where multiple hosts share an LBA the BE_SAN tracks writes and invalidates the unwritten buffers.

BRIEF DESCRIPTION OF THE FIGURES

The foregoing and other objects, features and advantages of the invention will be apparent from the following more comprehensive description of preferred embodiments of the invention, as illustrated in the accompanying drawings in which like reference characters refer to the same parts throughout the different views.

FIGS. 1A and 1B illustrate, respectively, a low-to-midrange PRIOR ART SAN with a network between hosts and data storage subsystem (SAN) with multiple virtual volumes (LUNs). Both Front-End and Back-End codes run on the same SAN controller. Traffic from all the hosts is serviced by the shared controller. If I/O traffic exceeds controller-processing capability, new requests will be queued. This legacy solution does not scale well since there is no option adding more controllers.

FIG. 2 (PRIOR ART) illustrates an improved SAN architecture; Front-End code executes on a Front-End CPU while Back-End code executes on a Back-End CPU. A virtual volume (represented by a Logical Unit Number—LUN) is accessed through one SAN controller while other controller(s) host other LUNs. Incoming requests, data structures, command queues, and data cache are mirrored through Back-End FC connections or via a dedicated link to support fail-over in case that either SAN controller fails.

FIG. 3 and FIG. 3A illustrate a new approach to SAN architecture; to improve speed Front-End code is executed on the Front-End CPU concurrently, in other words, multiple instances of the same code run independently on all FE_SAN controllers. Back-End code is executed on each Back-End CPU, independently of the other Back-End code executed on different BE_SAN controllers. The Back-End code provides RAID functionality, error recovery, locking mechanisms, etc.

FIG. 4 (PRIOR ART) shows a system view of I/O related layers to access SCSI devices using standard SCSI interface;

FIGS. 5A and 5B (PRIOR ART) is a system view of I/O related layers to access virtual volume (LUN) via traditional RAIDs or Storage Area Networks.

FIG. 6 is a system view of I/O related layers to access virtual disk (LUN) utilizing the SAN architecture of FIG. 3. As in traditional SAN solutions, the host has notion of having an ordinary SCSI device (disk drive) attached to it. The Front-End code creates a virtual device (virtual volume or LUN) that supports all mandatory SCSI commands. There are many instances of the same Front-End code running on FE_SAN controllers simultaneously providing much higher processing power compared to the Front-End code used in FIG. 5B. Similarly, the Back-End code used in FIG. 6 runs in parallel providing the superior performance due to concurrent execution, compared to the Back-End code used in FIG. 5B.

FIG. 7A (PRIOR ART) illustrates a single disk drive attached to multiple initiators. FIG. 7B (PRIOR ART) illustrates Storage Area Network system utilizing a monolithic Logical Volume Manager (LVM) to emulate behavior of the single disk or multiple drives. In FIGS. 7A and 7B, synchronization is done by the hosts utilizing reservation, persistent reservation or other access control methods. This monolithic LVM could create the bottleneck during heavy I/O traffic.

FIGS. 8A and 8B illustrate, respectively, enhancements to the system of FIG. 7B with a distributed Logical Volume Manager (LVM) providing reservation and persistent reservation and other locking mechanisms. Front-End LVM (FE_LVM) instances run independently and allocate resources from the Back-End LVM (BE_LVM) instances providing virtually exclusive access to allocated Logical Block Addresses (LBAs). This architecture facilitates parallel execution of the FE_LVM and BE_LVM code eliminating the bottleneck and providing excellent scalability.

FIG. 10 (PRIOR ART) illustrates Memory-mapped file technique commonly used in UNIX/Linux environments. A file or a portion of a file is mapped into application address space for directly accessing file data bypassing OS stack and SCSI layers. This technique minimizes the overhead associated with file data access.

FIG. 11 depicts an application communicating directly with Front-End (FE_SAN) controller firmware via a provided Application Programming Interface (API) and an Application Binary Interface (ABI). This eliminates OS and SCSI stack overhead and speeds up data access by mapping portion the FE_SAN controller memory containing file data into application address space to directly access the data placed in the memory.

FIG. 12 illustrates the Front-End firmware for a memory-mapped file on the FE_SAN controllers allocating corresponding memory buffers on the BE_SAN controllers for files distributed over a number of BE_SAN controllers. This enables an application to read and write data directly from/to controllers' memory via system and I/O buses by mapping portions of the FE_SAN controller's memory into application address space to provide direct access to the data placed in that portion of the FE_SAN memory. Furthermore, copy-on-write method provides data protection by copying data written to the FE_SAN allocated memory to the corresponding memory buffers on the BE_SAN controllers.

FIG. 13 gives details how Front-End firmware for a memory-mapped file on the FE_SAN controllers allocates corresponding independent memory buffers on the BE_SAN controllers. Synchronization of the written data is done upon explicit application request via provided API and ABI primitives.

FIG. 14 shows a flow diagram of an embodiment of a method of the present invention for data synchronization on an application request to commit the written data into FE_SAN controller's memory which is mapped into an application's address space.

FIG. 15 depicts a parallel file system module 1576 and 1578 running on the FE_SAN controllers 1572 and 1574 respectively. Provided API and ABI present methods, function calls and primitives to access the file system directly on the FE_SAN controller.

FIG. 16 illustrates an embodiment of the present invention where legacy storage RAID and SAN systems may be attached at the BE_SAN controllers.

DETAILED DESCRIPTION OF THE EMBODIMENTS

Figure 9:
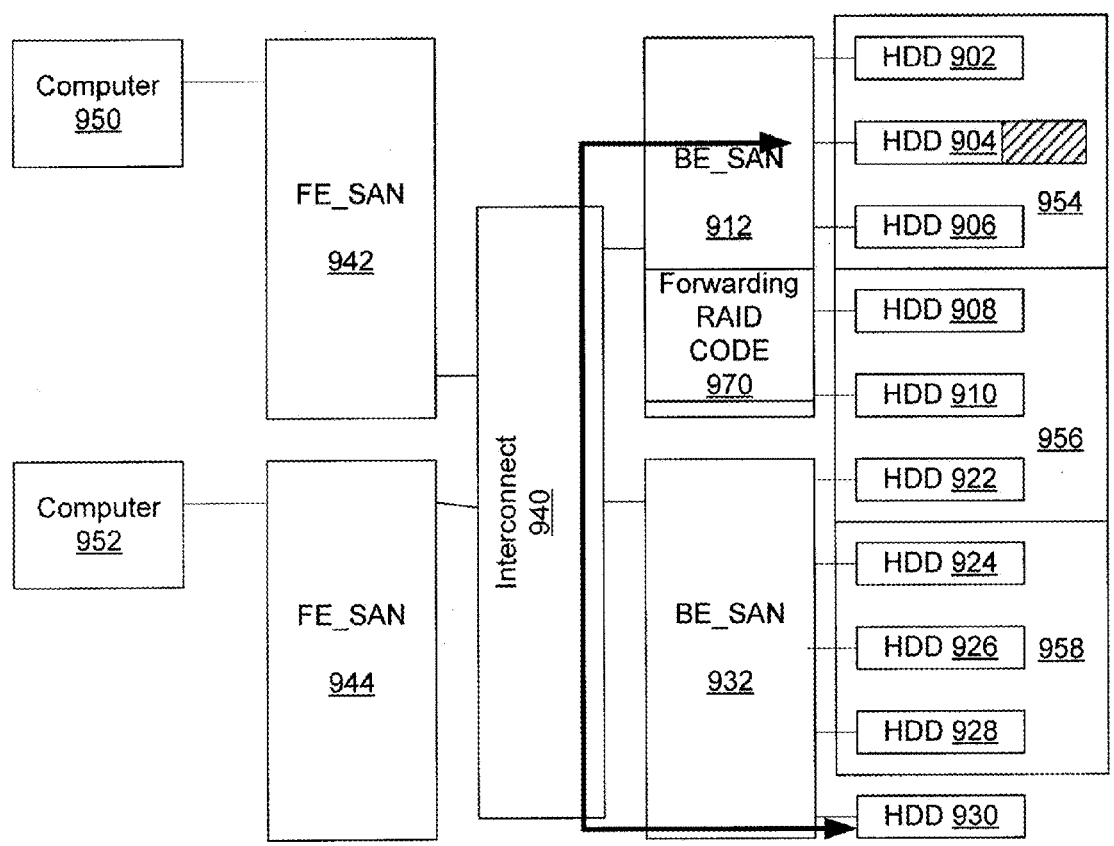
FIG. 9 illustrates virtual disks spanning multiple disk drives, and which may span multiple BE_SANs, and where hot-spare storage devices substituted for failed storage devices in RAID-organized virtual disks may be coupled to a different BE_SAN than the failed disk.

This invention relates generally to the field of storage RAID controllers and Storage Area Network (SAN) systems. Principally, the invention relates to improving data access speeds by facilitating massively parallel data access by separating Front-End and Back-End software or firmware functionality. Thus, the invention executes appropriate code concurrently on separate Front-End Storage Area Network (FE_SAN) and Back-End Storage Area Network (BE_SAN)

controllers connected via high-speed network (switched fabric such as InfiniBand, Serial Attached SCSI (SAS), Fibre Channel (FC), Myrinet, etc.).

A number of different storage interfaces may be supported at the BE_SAN with this invention, including standard devices such as SCSI, SAS, Advanced Technology Attachment (ATA), Serial ATA (SATA), FC, and other similar disk storage as well as PCI Express (PCIe), Hyper Transport (HT), etc. interfaces.

The FE_SAN interface card (FE_SAN controller) may be provided in different physical formats, PCI, PCI-X, PCIe, SBus, or other interface board formats. Each FE_SAN interface card has firmware (software) that provides SCSI device discovery, error handling and recovery, and some RAID functionality. The back-end may be provided in a number of different physical formats such as in the standard disk drive enclosure format (including 19 inch rack and standalone enclosures), or an integrated circuit that is easily adaptable to the standard interior configuration of a SAN controller.

Each BE_SAN controller has firmware (software) that provides SCSI device discovery, fault management, RAID functionality, and disk locking methods for portions of the physical disk, RDMA capability, and error handling functionality. The firmware on each BE_SAN controller (interface) provides all the functionality necessary to interface target disk storage interface such as SCSI, SAS, ATA, SATA, or FC disk drives or other data storage devices and systems.

In an embodiment, the FE_SAN has firmware that provides an Application Programming Interface (API) and an Application Binary Interface (ABI) to allow a host Operating System (OS) and applications to memory-map a file or part of a file residing in the FE_SAN controller memory to directly access the file data bypassing traditional OS stack and SCSI layers.

As ever-increasing demand for more data hence, for more data storage, SAN and RAID technologies available today have failed to meet performance requirements. However, this enabling scalable technology is specifically designed to extend system capabilities and eliminate I/O bottlenecks.

To achieve the best performance, every server or cluster node should be connected directly or through a rearrangeably non-blocking switched fabric to the SAN subsystem. The SAN subsystem should be able to support the sum of data rates on all links between the servers (or cluster nodes) and the SAN subsystem without significantly increasing the command queue size (the number of outstanding requests in the queue waiting to be executed). However, the architectural designs (hardware and software) of today's SAN subsystems create bottlenecks in the SAN controllers due to insufficient aggregate bandwidth and limited scalability. Even though Fibre Channel (FC) is designed with the intent to allow similar architectures, the protocol complexity and prohibitively high cost of the FC technology (HBAs and FC switches) effectively prevented significant progress in the field of data storage.

FIGS. 1A and 1B (PRIOR ART), illustrate a legacy approach to Storage Area Network design and implementation. Such SAN controller supports multiple virtual volumes (LUNs) creating an illusion that there are many independent disks. Both Front-End and Back-End code run on the same SAN controller providing as much performance as such implementation (hardware, firmware, or embedded software) allows. In addition, unusually, there is only one instance of code and data structures that handles particular virtual disk. Therefore, all I/O traffic associated with that particular virtual disk is handled by that code instance which could become a bottleneck in heavy I/O traffic conditions. However, again, one single instance of the data structures has to be accessed creating an opportunity for a bottleneck to occur. As motioned in the preceding paragraphs, this legacy solution does not scale well since there is no option to scale the processing power by adding more controllers. Most modern RAID systems use dual controllers to double the system's I/O performance and eliminate single point of failure (see FIG. 2—PRIOR ART). However, that approach does not scale beyond two controllers or solve the latency and I/O aggregation problem because the all attached hosts access the same system shared resources. Even though, the system shown in FIG. 2 (PRIOR ART) is an architectural improvement over the system depicted in FIGS. 1A and 1B, it still suffers from the same issues as the system in FIGS. 1A and 1B.

FIG. 3 and FIG. 3A, an embodiment of the present invention, illustrate the hardware architecture that enables parallel execution of the Front-End and Back-End code on the FE_SAN 352 and BE_SAN 354 controllers respectively. There are multiple instances of the Front-End code in memory 356 of each FE_SAN, and preferably one or more per host or cluster node. Likewise, one or more BE_SAN 354 controllers at the back-end execute Back-End code from BE_SAN memory 358 in parallel. FE_SAN and BE_SAN controllers are connected via interconnecting network 360, preferably via rearrangeably non-blocking Clos Network utilizing but not limited to inexpensive Myrinet or InfiniBand switches. Nevertheless, any network topology is allowed since the architecture is network (transport) neutral. However, if the underlying network provides lower latency and higher bandwidth the whole architecture will deliver better performance. This approach yields to the higher data rate and I/O performance compared to previously described legacy SAN system.

Preferably the present invention is implemented in firmware running over a multitasking pre-emptive Real Time Operating System (RTOS) on hardware platform comprised of one or more embedded Central Processing Units (CPUs), possibly Application-Specific Integrated Circuits (ASIC), or Field-Programmable Gate Arrays (FPGA), a Random Access Memory (RAM), and programmable input/output (I/O) interfaces. It is to be appreciated that the various processes and functions described herein may be either part of the hardware, embedded microinstructions running on the hardware, or firmware (embedded software) executed by the RTOS. However, it should be further understood that the present invention might be implemented in various other forms of hardware, software, firmware, or a combination thereof.

FIG. 4 (PRIOR ART) is high-level block diagram which illustrates software layers inside operating system software on the host side and directly attached storage devices such as Hard Disk Drive, CD/DVD drive, and other SCSI devices.

FIGS. 5A and 5B (PRIOR ART) are high-level block diagrams that show the same software layers inside operating system software as on FIG. 4 but also an external RAID system's Front-End and Back-End layers specific for legacy RAID and Storage Area Network controller. Certainly, there are more than just Front-End and Back-End layers in SAN software architecture however; this is not relevant for understanding of the concepts used in this invention.

The SCSI standard defines the device model and SCSI command set for all SCSI devices (please see FIG. 7A). The SCSI command set is designed to provide efficient peer-to-peer operation and control of SCSI devices (disk drives, tapes, printers, etc.) by an operating system. The SCSI command set provides multiple operating systems concurrent access and control over one or more SCSI devices. However, proper coordination of these activities between the multiple operating systems is critical to avoid data corruption. Commands that assist with coordination between multiple operating systems are described in the SCSI standard.

FIG. 6 is a high-level block diagram that illustrates how Front-End and Back-End codes are executed in parallel and independently on FE_SAN and BE_SAN controllers. The SCSI standard provides methods for a number of hosts (operating systems) to concurrently access and assert control over SCSI devices, but in a complex system such as the one shown on the FIG. 6 the standard SCSI commands may not be sufficient. If there was no mechanism to internally enforce atomic execution for read, write, and other commands, the data integrity could be jeopardized and with each additional initiator and target the system performance would keep going down. Consequently, such locking mechanism that provides atomicity has to be built in to the system. The issue is that atomic actions (requests or commands) must not be executed until it is safe to do so.

Atomic execution for some commands in the system from FIG. 6 is an essential part of the invention since it helps protect data integrity. Atomic execution requires that a certain "atomic" command be effectively executed in their entirety without interruption by of other commands or messages, regardless of whether those other commands precede or follow the atomic command. Front-End code, generally, performs command processing and translates Virtual Block Addresses (VBA) to Logical Block Addresses (LBA) and sends them to the appropriate BE_SAN controllers. The Back-End code, then, checks whether the command could be executed immediately or not. The command may have to be queued for later execution, or a BUSY signal could be returned to the Front-End code because the SCSI standard typically does not require a guarantee when and in what order commands are executed, particularly when components of a system are busy. Since, the Front-End and Back-End codes execute asynchronously until a command that requires atomic execution is to be started. For successful execution, all the requirements for successful completion of the atomic command have to be met before the atomic command can begin. In an embodiment, writing to device media is an atomic command.

For example, to ensure correct execution of a WRITE command, before writing data to intended LBAs, those LBAs have to be locked and off limit to other WRITE or READ commands. That means that WRITE command has to be executed atomically. The Front-End code examines the command; and determines that a WRITE command has been received. Then, it sends a LOCK request to the appropriate BE_SAN controllers to acquire a distributed lock. Back-End code responds acknowledging successful locking of the requested LBAs. At this point, it is safe to write to the locked LBAs, LBAs usually spread across multiple disk drives. Upon the successful completion of the WRITE command, the LOCK is removed by the Front-End code. There are some other commands that might require atomic execution; however the same locking mechanism could be used for those commands.

The previously described method does not permit concurrent writes to occur to the same LBAs, and thereby limits write performance to a single file. Indeed, it is not possible to actually write data to a disk media simultaneously from two different and independent sources without having a risk of actually corrupting the data. However, if sufficient buffer space is available at BE-SAN controllers the data that have to be written from number of different hosts (initiators) could be concurrently spooled into pre-allocated independent memory buffers without risking data corruption. To achieve this kind of parallelism on a WRITE request FE_SAN controller requests a LOCK for all LBAs that must be written to. If currently there are no other writers, the LOCK will be granted. However, if there is another writer holding a LOCK, every BE_SAN controller that has to be written to checks if there is sufficient buffer space to satisfy the request. If the request could be satisfied a tagged-LOCK will be issued and the data transfer from the host to the allocated buffer would be initiated. The actual writes to the disks would be done in the order that tagged-LOCKs are granted. If the Front-End code for some reason was unable to acquire a LOCK for all the LBAs that it needs it will release all already-locked LBAs and start the process all over again. In case that default number of attempts is exceeded upper management software layers will resolve the issue by verifying the reason for the unsuccessful locking.

An additional advantage is that the LOCKs are associated with LUNs using specific ID (identifiers). Therefore, Back-End code would not have to search through long LOCK tables to discover whether a command (request) could be executed or not. Another advantage is that only LBAs that are locked out might be inaccessible during that time. All other LBAs remain accessible allowing greater level for parallelism.

The actual implementation may vary due to use of some specific hardware or of the shelf software. However, the principal architecture would not change. It would be relatively straight forward to use of-the-shelf inexpensive but not limited to x86 hardware platforms with embedded RTOS or embedded Linux OS on it for the BE_SAN controllers since great deal of functionality is already available. For the FE_SAN controllers the same platform could be used as for the BE_SAN controllers. However, if InfiniBand or Myrinet network is the interconnect of choice between FE_SAN and BE_SAN controllers it would be natural to use of the shelf or modified PCIe single board computer or Myrinet interface cards to execute Front-End code on them. In alternative embodiments, such as those where communications between FE_SAN and host are over a PCI or other bus, a PCI or other bus single-board computer may be used. For entry-level systems, where the cost is more important than performance, the Front-End code could be embedded in the device driver or in a software module running on the host computer.

In an embodiment, individual storage units such as hard disk drives 902, 904, 906, 908, 910 are coupled to back-end storage controller (BE_SAN) 912. Further, individual storage units such as hard disk drives 922, 924, 926, 928, 930 are coupled to at least a second back-end storage controller (BE_SAN) 932. Both BE_SANs 912, 932 are coupled to be accessed through network 940 from at least one or more FE_SAN controller 942, 944. Further, each FE_SAN is coupled to at least one host computer 950, 952.

FIG. 9 illustrates virtual disks that span multiple disk drives, such as virtual disks 954, 956, 958. In an embodiment, virtual disk 954 uses hard disks 902, 904, 906, virtual disk 956 uses hard disks 908, 910, 922—spanning two BE_SANs, and virtual disk 958 uses hard disks 924, 926, and 928. Hard disk 930 is initially a hot spare storage device. Virtual disk 954 is configured as a RAID (redundant array of independent disk drives) storage system. In normal operation, storage references to virtual disk 954 are processed in part by BE_SAN 912 executing RAID code 970 on a processor, such as a CPU of BE_SAN 912. RAID code 970 includes code for writing physical drives, such as drives 902, 904, 906, recognizing failed disk drives, for reconstructing data read from functioning drives and transmitting that data through network 940 to an accessing FE_SAN, all as per specifications for one or more of RAID modes 1, 10, 2, 3, 4, 5 and 6 as known in the art of RAID storage systems. In a particular embodiment, virtual disk 954 is configured to operate as a RAID-5 mode virtual disk, with block-level striping and distributed parity, such that redundancy is minimized but data is recoverable even if one drive used by virtual disk 954 has failed. In an alternative embodiment, virtual disk 954 is configured to operate as a RAID-6 mode virtual disk system.

In an embodiment, virtual disk 958, operating with drives 924, 926, 928, on the second BE_SAN 932, is also configurable as a RAID, in an embodiment a RAID-5 mode virtual disk, and in an alternative embodiment a RAID-6 mode virtual disk.

Some existing RAID controllers, including some operable in RAID-5 or RAID-6 modes, have the ability to reconstruct data onto a replacement hard disk from remaining disks used by a RAID dataset or virtual disk; in these systems, once a failed disk has been replaced with a spare disk, data is reconstructed onto the spare disk. Once data is reconstructed onto the spare disk-which becomes a formerly-spare disk, redundancy is restored and, should a second disk used by the RAID virtual disk fail in turn, data can once again be reconstructed from still-functioning disks (which may include the formerly-spare disk) and provided to host systems.

A "hot spare" is a disk that is attached to a RAID controller, and unused by existing configured virtual disks. When a disk containing part of data of a RAID virtual disk fails, the "hot spare" may be substituted for the failed disk without requiring that a technician physically replace the failed disk. In some systems this replacement may require operator intervention, and in other systems a hot-spare may be substituted for a failed disk automatically. Once a hot-spare is substituted into a RAID dataset or virtual disk, data may be reconstructed onto the hot-spare—which becomes a formerly-spare disk and redundancy may be restored. Typically, however, the hot-spare must be attached to the same RAID controller as the failed drive.

In an embodiment, a storage system such as the one depicted on the FIGS. 3 and 3A provides access to the stored data on the storage media via FE_SAN 352 controller's device driver and SCSI interface. However, the same storage system provides an API and ABI for mapping portion of the FE_SAN controller memory 356 into application address space. UNIX, Linux, and other Operating Systems provide methods, such as POSIX-compliant mmap( ) system call, (see FIG. 10—PRIOR ART), that allows an application 1010 to map a file 1012 into its memory 1014. Therefore, there is one-to-one correspondence between a memory address and a word in the file. For example, Linux kernel documentation describes in details how mmap method is used in Linux and how the PCI memory is mapped above the highest system memory.

FIG. 11 illustrates host I/O stack and Front-End firmware API and ABI providing direct access to the FE_SAN controller memory buffers. UNIX/Linux system calls such as mmap( ), munmap( ), msync( ), mprotect( ), and madvise( ) or equivalent may be used to manage the file data and memory access.

In an embodiment on FIG. 12, it is shown how memory buffers 1272B and 1274B corresponding to a file LBAs may be allocated, mapped, and distributed across a number of FE_SAN controllers 1272 and 1274 and BE_SAN controllers 1212, 1232, and 1250. Front-End firmware 1272FW and 1274FW running on FE_SAN controllers 1272 and 1274 allocates and manages memory buffers 1272B and 1274B upon receiving a request from an application 1280A or 1282A or host OS via provided API and ABI to map a file or portion of a file into application address space. In addition, the memory buffers may have one or more MEMORY BUFFERs ATTRIBUTEs (MEM_BUFF_ATTR) that define the system behavior upon a command or control message is received.

Applications 1280A and 1282A running on computers 1280 and 1282 (FIG. 12) may send a request to map a file or portion of a file into their respective address spaces; Front-End firmware 1272FW or 1274FW running on FE_SAN 1272 and 1274 controllers sends a request, as needed, to the corresponding Back-End firmware 1212FW, 1232FW, or 1250FW running on BE_SAN 1212, 1232, and 1250 controllers to process the request. The memory buffers 1272B, 1274B, 1212B, 1232B, and 1250B are dynamically allocated and managed upon application accesses a specific memory location (that corresponds to a specific LBA). When applications 1280A and 1282A write data to the memory mapped file, a copy-on-write method is used to automatically copy data from FE_SAN "mmapped" (memory-mapped) buffers 1272B and 1274B to corresponding buffers 1212B, 1232B, and 1250B allocated on the BE_SAN controllers 1212, 1232, and 1250. It is presumed that the application(s) that were granted direct memory access to the FE_SAN 1272 and 1274 controllers' memory buffers assume complete control and responsibility for synchronizing and maintaining the file data coherency. For example, a number of different flags can be used with mmap method. Linux mmap( ) man page gives an example of how mmap( ) is implemented in Linux. However, these memory-mapped buffers physically reside in the FE_SAN controller's memory and are mapped into the address space used by the kernel or application at what ordinarily be a software buffer location.

If an application running on host computer 1280 writes data to mmapped memory buffers, of a file, in the FE_SAN controller 1272, the copy-on-write method copies data automatically to the corresponding buffers 1212B, 1232B, and 1250B on BE_SAN controllers 1212, 1232, and 1250. Because, Back-End firmware 1212FW, 1232FW, or 1250FW maintains information about all LBAs that are cached in "mmapped" memory buffers 1272B and 1274B for all FE_SAN controllers 1272 and 1274; if data is modified on one FE_SAN controller (say 1272), based on the MEM_BUFF_ATTR, the corresponding memory addresses may be automatically invalidated on all other FE_SAN controllers (in this example this would be FE_SAN 1274). As described above, on msync( ) system call a LOCK is placed on the LBAs and corresponding memory buffers 1212B, 1232B, and 1250B that have to be flushed to the media to prevent any data modification until the transaction is complete. Because of the latency related to copy-on-write method between FE_SAN and BE_SAN controllers' memory buffers, the data coherency should be guaranteed and maintained by the applications; for instance, an explicit request such as msync( ) or msync_buff( ) could be used to accomplish data synchronization. Typically, msync( ) call is associated with synchronizing data to the media. However, an msync_buff( ) call synchronizes the data in the memory of the FE_SAN and BE_SAN controllers without immediately writing the data to the media.

In an embodiment on FIG. 13, it is shown how memory buffers 1272B and 1274C may be allocated, mapped, and distributed across a number of FE_SAN 1372 and 1374 and BE_SAN 1312, 1332, and 1350 controllers. However, the main difference between the apparatus depicted on FIG. 12 and FIG. 13 is that all memory buffers 1372B and 1374C on the FE_SAN controllers 1372 and 1374 have their corresponding independent buffers 1312B, 1332B, 1350B, and 1312C, 1332C, 1350C on the BE_SAN controllers 1312, 1332, and 1350. Thus, the method to create corresponding memory buffers on the BE_SAN controllers is the same as described above. However, when synchronizing the data, on msync( ) request, all the buffers containing the file data that need to be synchronized are specified in the request. Also, which buffers are invalidated and which are not, on the FE_SAN and BE_SAN controllers, depends on whether they contain a newly written data and on the attributes found in the MEM_BUFF_ATTR. This behavior is explained in details, in an example, in the following flow chart (FIG. 14). The key benefit to maintaining independent memory buffers on the BE_SAN controllers 1312, 1332, and 1350 is that concurrent copy-on-write, even to the same LBAs, does not alter the coherent view of the file data. When an application wants to commit the newly written data to the memory mapped file 1012 (for example, the new data written by application 1380A to the memory buffers 1372B on the FE_SAN controller 1372 and mirrored to corresponding independent buffers 1312B, 1332B, and 1350B on the BE_SAN controllers 1312, 1332, and 1350), the file data synchronization is done upon explicit request. Thus, the applications on different host computers 1380 and 1382 may see different data if the buffers 1372, 1374, 1312B, 1332B, 1350B, 1312C, 1332C, and 1350C are not synchronized. This atomic synchronization is done upon receiving an explicit request, for example using msync( ) or msync_buff( ) calls, from an application 1380A or host OS, via provided API and ABI. In addition, copy-on-write (data mirroring) protects the data in case that either FE_SAN 1372 or 1374 or BE_SAN controller 1312, 1332, or 1350 fails.

Similarly to the apparatus and method described with reference to FIG. 12, Back-End firmware 1312FW maintains information about all "mmapped" memory buffers 1372B and 1374C on all FE_SAN controllers 1372 and 1374. For example, an application 1380A on the computer 1380 issues msync( ) or msync_buff( ) synchronization request via Front_End firmware 1372FW running on the EF_SAN controller 1372. Upon receiving msync( ) request, the Back-End firmware 1312FW synchronizes the data written by the application 1380A. Thus, subsequent read commands return the data with the latest and up-to-date changes. However, if the data in the memory buffers 1374C is modified, the MEM_BUFF_ATTRs for the buffers of the file define whether the modified data should be invalidated or not. Thus, the actual behavior of the system may be altered by privileged applications and users.

The flow diagram of an embodiment on the FIG. 14 shows a method of the present invention for data synchronization which is done upon an application 1380A request to commit the written data into FE_SAN controller's memory which is mapped into the application's address space. However, the file or portion of the file is mapped via corresponding memory buffers 1372B and 1374C to the applications' 1380A and 1382A address spaces via API and ABI primitives.

The method is entered at step 1410 after application 1380A sends a request to the Front-End firmware 1372FW to synchronize the data that is placed into specified LBAs in the memory buffers 1372B. The Front-End firmware 1372FW calculates on which BE_SAN controllers 1312, 1332, or 1350 the mirrored LBAs reside. Then at step 1420 the Front-End firmware 1372FW sends synchronize (LBAs) requests to all BE_SAN controllers 1312, 1332, or 1350 that own the modified LBAs.

At step 1430, Back-End firmware 1312FW executes lock (LBAs) method placing LOCKs on all memory buffers 1312B and 1312C containing the modified LBAs. At step 1431 the Back-End firmware 1312FW executes sync_lbas (LBAs) which either modifies the pointers to point to the memory locations with up-to-date data or copies to the memory locations that maintain the up-to-date LBAs.

At step 1432 the firmware 1312FW creates a list of all the FE_SAN controllers that keep cached version of the LBAs that are to be synchronized and at step 1433 sends a (multicast) message to those FE_SAN controllers (in this example 1374) requesting that those LBAs, or the data in the corresponding memory buffers, to be invalidated.

In this example, FE_SAN controller 1374 is the only controller that keeps those LBA in the cache; thus, at the step 1440 the Front-End firmware receives and starts the execution of invalidate_msg (LBAs). At the next step 1441, the Front-End firmware 1374FW determines if those LBAs contain modified data since the last update from the BE_SAN controller. If the answer is No, it proceeds to the step 1443 and invalidates specified LBAs and sends the done_invalid_msg (LBAs) to the requesting BS_SAN controller (1312).

At the step 1444, Back-End firmware on the BE_SAN controller 1312 invalidates the corresponding buffers from the previous step, updates pointers and proceeds to step 1434.

At step 1434 requesting Back_End firmware 1312FW releases the locks for the successfully invalidated LBAs on the FE_SAN controllers (1374) and the method 1410 ends.

However, if the answer at step 1441 is Yes, then the firmware determines from the MEM_BUFF_ATTR whether it should or should not invalidate those LBAs (or pages). If the answer is Yes, proceeds to the step 1443; however, if the answer is No then it proceeds to the step 1444 and informs the Back-End firmware about the action taken.

At step 1434 the Back_End firmware 1312FW releases the locks for the LBAs (or pages) specified in the message from the FE_SAN controllers (1374) and the method 1410 ends. Obviously, the actual implementation, based on the actual hardware properties, may be somewhat different than the case presented in the example here but the main idea would stay the same.

Back-End firmware 1312FW, 1332FW, and 1350FW running on BE_SAN controllers 1312, 1332, and 1350 maintain read and write pointers (for each memory buffer) on every FE_SAN controller 1372 and 1382 and BE_SAN controller 1312, 1332, and 1350. Thus, on an application msync( ) request the read pointers for the memory pages specified in msync( ) request for all FE_SAN controllers will point to the memory buffers with the up-to-date data or the latest written data as described above. Thus, all the memory buffers specified in msync( ) request on all other FE_SAN controllers based on the MEM_BUFF_ATTR attributes may be automatically invalidated. The granularity of the memory buffers is one page (or block) which is typically 512 bytes or 4 KB in size, obviously the actual size depends on specific hardware and software implementation. When an application writes into a memory buffer on the FE_SAN controller 1372 then a dirty data flag is set automatically. When application commits the data, the Back-End firmware looks into a list to find all FE_SAN controllers which cached that particular page(s) and sends a multicast message to invalidate that/those page(s) on all other FE_SAN controllers (in this case FE_SAN controller 1372).

Thus, in general, if in the meantime another instance of an application has altered the same page(s) (LBAs) on another FE_SAN controller then based on the attributes set in the MEM_BUFF_ATTR it is defined what the firmware on that controller does, either invalidates that page(s) and rereads it/them from the BE_SAN controller(s) on the next attempt to read from the page or ignores the "invalidate" message. In either case, the parallel application has to be aware that the data may have been altered on a remote FE_SAN controller.

However, if for some reason an application does not coordinate the I/O requests but still requires strict data coherency, then the data coherency may be maintained by executing atomic write or read requests which acquire locks and execute atomically as described herein for a standard write command.

In addition, as described above, periodically or on mflush( ) system call, a LOCK is placed on the LBAs and memory buffers that have to be flushed to the media to prevent any data changes while the transaction is in progress. Thus, upon completion of the current "flush data to the media" command, the data on the media is up-to-date.

If an explicit "atomic" read or write operation is required, an application executes an atomic read a_read( ) or atomic write a_write( ) call. An atomic read or write request always invokes synchronization primitives using the same method as described above. Thus, a_read( ) request issued by any application running on a 1380 or 1382 computer after a_write( ) always returns the latest data. In this case MEM_BUFF_ATTR cannot alter this atomic execution. The behavior of a_read( ) and a_write( ) commands is the same as if a SCSI read or write command is issued with a Force Unit Access (FUA) or FUA_NV (Force Unit Access Non-Volatile) bit set.

In addition, if an application needs/wants to create a persistent shared memory, it creates a memory mapped shared file while the coherent view of the data enforcement may be done by simply executing "atomic" a_read( ) and a_write( ) commands/calls. However, the techniques described above may be used to accomplish the same goal if strict data coherency is not required; even write-back-caching without mirroring technique may be used.

FIG. 15 depicts a parallel file system module 1576 and 1578 running on the FE_SAN controllers 1572 and 1574 respectively. Any parallel file system that supports direct access to a block devices such as GPFS, QFS, block layout pNFS, StorNExt, etc. may be ported to physically reside on the FE_SAN controllers. This technique allows additional optimization and performance improvement to be done by eliminating unnecessary SCSI layers, eliminating data copy from the FE_SAN controller memory to the server memory and in many cases copying the same data one or more times to the application memory, while provided API and ABI present methods, function calls, and primitives to access the file system directly on the FE_SAN controller.

A file system module (1576 or 1578) residing on the FE_SAN controller 1572 or 1574, communicates directly with the FE_SAN controller Front-End firmware 1572FW and 1574FW. In addition, the Front-End firmware 1572FW and 1574FW provides automatic synchronization as described above for all fread( ) fwrite( ), fopen( ), fclose( ), and other calls made to the file system modules 1576 and 1578.

However, if the system cost is the most important concern, then the entire or part of the file system modules 1576 and 1578 could be executed in host computers' 1580 and 1582 memory as separate software modules communicating with FE_SAN controller's firmware via provided API and ABI.

In another embodiment of the present invention illustrated in FIG. 16, in addition to providing support for storage devices such as HDDs and SSDs, 1624, 1626, 1628, and 1629 attached at BE_SAN controller(s) 1632 (and/or 1612), it may also support and integrate legacy storage RAID and SAN systems, 1654 and 1656, as well as other storage devices that can be accessed via directly connected links or via SAN Interconnect(s) 1662. Thus, the data stored on the back-end storage devices, 1624, 1626, 1628, and 1629, as well as on legacy storage systems, 1654 and 1656, may be accessed by an application via FE_SAN, 1672 and 1674, and BE_SAN controllers 1612 and 1632. The benefit of using such approach is to leverage the existing storage infrastructure while caching technique and method described in the present invention and supported by FE_SAN, 1672 and 1674, and BE_SAN controllers' 1612 and 1632, hardware and embedded firmware and software to aggregate, reshape, and cache the data to speed up an application access to the cached data. Because of the FE_SAN and BE_SAN controllers' ability to aggregate the cached data and reshape the back-end I/O traffic, the utilization of the legacy RAID and SAN systems, 1654 and 1656, should be also improved due to receiving mostly optimal I/O workload. The LUNs presented by the legacy storage systems 1654 and 1656 may be re-exported via BE_SAN and FE_SAN controllers, 1672, 1674, 1612, and 1632, or aggregated into new LUNs and presented to the host systems 1680 and 1682. Any network topology of interconnecting networks (or fabrics) 1661 and 1662 is allowed. All data access and locking methods as well as FE_SAN controller's memory mapping methods disclosed in this document may be used with the system architecture presented in the FIG. 16. In addition, the system may be used with embedded file systems as described above.

The term firmware as used herein with reference to FE_SAN and BE_SAN firmware includes machine readable instructions executable by a processor and present in a memory associated with that processor, whether the memory is a read-only memory, an erasable (whether ultraviolet or electrically) and rewritable read only memory, or a random-access memory loaded when the system is started. As such, the term firmware may include portions traditionally defined as software as well as portions traditionally defined as firmware.

The foregoing description should not be taken as limiting the scope of the disclosure. It should thus be noted that the matter contained in the above description or shown in the accompanying drawings should be interpreted as illustrative and not in a limiting sense. The following claims are intended to cover generic and specific features described herein, as well as all statements of the scope of the present method and system.

What is claimed is:

1. A data processing system having a storage area network (SAN), the system comprising:
at least a first and a second host processor central units (CPUs), the first CPU coupled to a first FE_SAN (Front End SAN) controller and the second CPU coupled to a second FE_SAN controller, the first CPU configured to execute first FE_SAN virtualization firmware, and the second CPU configured to execute second FE_SAN virtualization firmware;
at least a first and a second Back End SAN controller (BE_SAN), each BE_SAN being interconnected via at least one back-end network to a plurality of storage devices;
a network interconnecting the FE_SANs with the BE_SANs; and
BE_SAN virtualization firmware executing on the BE_SANs;
wherein the FE_SAN virtualization firmware and the BE_SAN virtualization firmware are together configured to request data from a particular BE_SAN of the at least a first and a second BE_SANs when data is required by a particular requesting host CPU of the host CPUs; and
wherein an operating system (OS) executing on a first CPU maps a portion of physical memory as a first buffer of a first logical block address (LBA) into an application's address space allowing the application to directly access that memory;

wherein a copy-on-write method is used to automatically copy data from the first buffer to at least one corresponding buffer allocated on the first BE_SAN;

wherein, if an operating system executing a host maps a portion of the second FE_SAN controller's memory as a second buffer of the first LBA into an application's address space, and if data of the first buffer is modified by a host coupled to the first FE_SAN, the first BE_SAN controller notifies the second FE_SAN to invalidate data of the second buffer.

2. The system of claim 1 wherein the FE_SAN and BE_SAN firmware is configured for writeback caching without mirroring.

3. A data processing system having a storage area network (SAN), the system comprising:

at least a first and a second host processor central units (CPUs), the first CPU coupled to a first FE_SAN (Front End SAN) controller and the second CPU coupled to a second FE_SAN controller, the first FE_SAN controller and first CPU configured to execute first FE_SAN virtualization firmware, and the second FE_SAN controller and second CPU configured to execute second FE_SAN virtualization firmware;

at least a first and a second Back End SAN controller (BE_SAN), each BE_SAN being interconnected via at least one back-end network to a plurality of storage devices;

a network interconnecting the FE_SANs with the BE_SANs; and

BE_SAN virtualization firmware executing on the BE_SANs;

wherein the FE_SAN virtualization firmware and the BE_SAN virtualization firmware are together configured to request data from a particular BE_SAN of the at least a first and a second BE_SANs when data is required by a particular requesting host CPU of the host CPUs; and wherein an operating system (OS) executing on a first CPU maps a portion of physical memory as a first buffer of a first logical block address (LBA) into an application's address space allowing the application to directly access that memory;

wherein a copy-on-write method is used to automatically copy data from the first buffer to at least one corresponding buffer allocated on the first BE_SAN;

wherein, if an operating system executing a host maps a portion of the second FE_SAN controller's physical memory as a second buffer of the first LBA into an application's address space, and if data of the first buffer is modified by a host coupled to the first FE_SAN, the first BE_SAN controller notifies the second FE_SAN to invalidate data of the second buffer; and wherein the FE_SAN and BE_SAN firmware is configured for writeback caching with mirroring.

4. A data processing system having a storage area network (SAN), the system comprising:

at least a first and a second host processor central units (CPUs), the first CPU coupled to a first FE_SAN (Front End SAN) controller and the second CPU coupled to a second FE_SAN controller, the first FE_SAN controller and first CPU configured to execute first FE_SAN virtualization firmware, and the second FE_SAN controller and second CPU configured to execute second FE_SAN virtualization firmware;

at least a first and a second Back End SAN controller (BE_SAN), each BE_SAN being interconnected via at least one back-end network to a plurality of storage devices;

a network interconnecting the FE_SANs with the BE_SANs; and

BE_SAN virtualization firmware executing on the BE_SANs;

wherein the FE_SAN virtualization firmware and the BE_SAN virtualization firmware are together configured to request data from a particular BE_SAN of the at least a first and a second BE_SANs when data is required by a particular requesting host CPU of the host CPUs; and wherein an operating system (OS) executing on a first CPU maps a portion of physical memory as a first buffer of a first logical block address (LBA) into an application's address space allowing the application to directly access that memory;

wherein a copy-on-write method is used to automatically copy data from the first buffer to at least one corresponding buffer allocated on the first BE_SAN;

wherein, if an operating system executing a host maps a portion of the second FE_SAN controller's physical memory as a second buffer of the first LBA into an application's address space, and if data of the first buffer is modified by a host coupled to the first FE_SAN, the first BE_SAN controller notifies the second FE_SAN to invalidate data of the second buffer; and wherein the FE_SAN and BE_SAN firmware is configured for writeback caching with and without mirroring.

5. The system of claim 4 wherein the FE_SAN and BE_SAN firmware is configured for writeback caching without mirroring.

* * * * *